(12) United States Patent
Orosa et al.

(10) Patent No.: US 12,368,914 B1
(45) Date of Patent: Jul. 22, 2025

(54) GRAPH-BASED CONTEXTUAL TARGETING OF CONTENT CONSUMERS

(71) Applicant: Oracle International Corporation, Redwood Shores, CA (US)

(72) Inventors: John Orosa, Castle Park (GB); Jason Loring Canney, Broomfield, CO (US); Monica Wedgwood, Bucureștii Noi (RO); Hilary Joy Traut, Broomfield, CO (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/659,236

(22) Filed: May 9, 2024

(51) Int. Cl.
*H04N 21/258* (2011.01)
*H04N 21/24* (2011.01)
*H04N 21/84* (2011.01)

(52) U.S. Cl.
CPC ... *H04N 21/25891* (2013.01); *H04N 21/2407* (2013.01); *H04N 21/84* (2013.01)

(58) Field of Classification Search
CPC ......... H04N 21/25891; H04N 21/2407; H04N 21/84
See application file for complete search history.

(56) References Cited

U.S. PATENT DOCUMENTS

| | | | |
|---|---|---|---|
| 7,346,606 B2 * | 3/2008 | Bharat | G06Q 30/0269 707/999.005 |
| 8,909,546 B2 * | 12/2014 | Horvitz | H04L 67/535 705/14.4 |
| 9,639,846 B2 * | 5/2017 | Kohn | G06Q 30/02 |
| 2008/0086372 A1 * | 4/2008 | Madhavan | G06Q 30/0277 705/14.55 |

OTHER PUBLICATIONS

Gohary et al., Personality Traits as Predictors of Shopping Motivations and Behaviors: A Canonical Correlation Analysis, Arab Economics and Business Journal, 9 (2014), 166-174.

(Continued)

*Primary Examiner* — Nnenna N Ekpo
(74) *Attorney, Agent, or Firm* — MUGHAL GAUDRY & FRANKLIN PC

(57) ABSTRACT

A computer system is described for receiving a request for secondary content to be included in an active user session with a content distribution service. In response to the request, the computer system determines whether the content distribution service is included in a set of labeled content distribution services. If not, the computer system retrieves primary content from the content distribution service in an automated second active session with the content distribution service. The computer system then generates a vector embedding of the primary content for comparison with vector embeddings of contextual personality categories. The content distribution service is labeled with a contextual personality category based on the comparison, and the labeled content distribution service is added to the set of labeled content distribution services for use in providing targeted secondary content for inclusion in active user sessions. Contextual personality labels for sites may be used to update contextual personality labels for candidate consumers visiting the sites, and vice versa.

20 Claims, 7 Drawing Sheets

(56) References Cited

OTHER PUBLICATIONS

Lindahl, "The relationship between personality, emotions, and customer loyalty in the Finnish Telecommunications market", Mid Sweden University, 2022.
Tuhin, "Strengthening Consumer Loyalty: The role of Brand Personality and Consumer Involvement", The Jahangirnagar Journal of Business Studies, vol. 7, No. 1, Jun. 2018.

* cited by examiner

GRAPH-BASED CONTEXTUAL TARGETING OF CONTENT CONSUMERS

CROSS REFERENCE OF RELATED APPLICATIONS

This application claims priority to Romanian Patent Application No. 2024 00239, filed on May 9, 2024, titled "GRAPH-BASED CONTEXTUAL TARGETING OF CONTENT CONSUMERS", which is incorporated by reference in its entirety for all purposes.

BACKGROUND

Web sites and digital media showing primary content or content streams may include placeholders or locations for placing secondary content. Secondary content may be selected for inclusion in the primary content based on policies established between the primary content providers and the secondary content providers. For example, a news content provider may establish a policy with an automobile manufacturer to place secondary content about automobiles on the news content provider's sites. The automobile manufacturer may compensate the news content provider based on website views and/or news channel ratings.

Secondary content providers may select different primary content providers for placing their secondary content based on a campaign to reach candidate consumers of not only the secondary content placed but of goods and/or services offered by the secondary content providers. Secondary content providers may miss content placement opportunities and make sub-optimal decisions about content placement opportunities based on limited information available and the reliance on high-level human decision-making based on future unknown circumstances.

BRIEF SUMMARY

A computer system is described for receiving a request for secondary content to be included in an active user session with a content distribution service. In response to the request, the computer system determines whether the content distribution service is included in a set of labeled content distribution services. If not, the computer system retrieves primary content from the content distribution service in an automated second active session with the content distribution service. The computer system then generates a vector embedding of the primary content for comparison with vector embeddings of contextual personality categories. The content distribution service is labeled with a contextual personality category based on the comparison, and the labeled content distribution service is added to the set of labeled content distribution services for use in providing targeted secondary content for inclusion in active user sessions. Contextual personality labels for sites may be used to update contextual personality labels for candidate consumers visiting the sites, and contextual personality labels for candidate consumers visiting sites may be used to update contextual personality labels for the sites.

In some embodiments, a computer-implemented method includes receiving a first request for secondary content to be included in a first active user session with a content distribution service. The first request identifies an address of the content distribution service. The content distribution service provides primary content for user consumption in the first active user session. In response to the first request and based at least in part on the address, the method includes determining whether the content distribution service is included in a set of labeled content distribution services. Based at least in part on determining that the content distribution service is not included in the set of labeled content distribution services, the method includes retrieving the primary content from the address in an automated second active session with the content distribution service, and generating one or more vector embeddings of the primary content for comparison with a plurality of vector embeddings from a plurality of contextual personalities to select one or more contextual personality labels, wherein each of the plurality of vector embeddings is determined from a plurality of content items that have been associated with corresponding contextual personalities. The content distribution service is added, in association with the one or more contextual personality labels, to the set of labeled content distribution services. A second request is received for secondary content to be included in a third active user session with the content distribution service. In response to the second request, the method includes determining that the content distribution service is included in the set of labeled content distribution services in association with one or more contextual personality labels. Accessing the set of labeled content distribution services to determine the one or more contextual personality labels does not require personal information about a second active user of the third active user session. The method further includes causing one or more secondary content items associated with the one or more contextual personality labels to be included in the third active user session with the content distribution service.

In a further embodiment, the one or more vector embeddings of the primary content are based at least in part on a first determination of whether the primary content has keywords of a first set of keywords associated with a first contextual personality label, and a second determination of whether the primary content has keywords of a second set of keywords associated with a second contextual personality label. In this embodiment, the one or more contextual personality labels include at least the first contextual personality label and exclude at least the second contextual personality label based at least in part on the keywords in the primary content.

In the same or another embodiment, the method further includes automatically generating a textual description of image data in the primary content. In this embodiment, the one or more vector embeddings of the primary content are based at least in part on a first determination of whether the textual description has keywords of a first set of keywords associated with a first contextual personality label, and a second determination of whether the textual description has keywords of a second set of keywords associated with a second contextual personality label. The one or more contextual personality labels for the primary content include at least the first contextual personality label and exclude at least the second contextual personality label based at least in part on the keywords in the textual description.

In the same or another embodiment, the second request for secondary content identifies the second active user of the third active user session, and the method further includes updating a profile of the second active user by adding a stored association with the one or more contextual personality labels. The profile causes the second active user to be included in a content delivery campaign. User input parameters to the content delivery campaign identify the one or more contextual personality labels without identifying the second active user. The content delivery campaign causes delivery of particular content to the second active user using contact details of the second active user from the profile of the second active user.

In the same or another embodiment, the method includes storing a plurality of profiles for a plurality of users associated with a particular contextual personality label, and determining that a subset of users of the plurality of users visited a particular content distribution service that is included in the set of labeled content distribution services but is not labeled with the particular contextual personality label. Based on determining that the subset of users visited the particular content distribution service, the method includes adding the particular contextual personality label to the particular content distribution service in the set of labeled content distribution services.

In the same or another embodiment, the method includes storing a plurality of profiles for a plurality of users associated with a particular contextual personality label, and determining that a subset of users of the plurality of users has not visited a particular content distribution service that is included in the set of labeled content distribution services and is labeled with the particular contextual personality label. Based on determining that the subset of users has not visited the particular content distribution service, the method includes removing the particular contextual personality label from the particular content distribution service in the set of labeled content distribution services.

In the same or another embodiment, the method includes determining which content to promote to a particular user based at least in part on a score, in a particular profile of the particular user, of one or more contextual personality labels. The method causes delivery, to the particular user, of particular content marked with the one or more contextual personality labels, wherein the particular content includes an embedded tracking identifier. The method then uses the embedded tracking identifier to track engagement by the particular user, with the particular content, and updates the particular profile of the particular user to increase the score of the one or more contextual personality labels based at least in part on the tracked engagement.

In the same or another embodiment, the method includes determining which content to promote to a particular user based at least in part on an association between the particular user and one or more contextual personality labels. The method causes delivery, to the particular user, of particular content based on content metadata comprising a score of the particular content for the one or more contextual personality labels, wherein the particular content includes an embedded tracking identifier. The method then uses the embedded tracking identifier to track engagement by the particular user, with the particular content, and updates the score of the particular content for the one or more contextual personality labels to increase the score based at least in part on the tracked engagement.

In the same or another embodiment, the method includes, based at least in part on the set of labeled content distribution services, determining a set of keywords associated with the one or more contextual personality labels. The method provides a plurality of keywords of the set of keywords as a prompt to a large language model to automatically generate graphical content to be included in a corpus of content for delivery in association with the one or more contextual personality labels. The method then selects the automatically generated graphical content as at least part of the one or more secondary content items.

In the same or another embodiment, the method includes, based at least in part on the set of labeled content distribution services, determining a set of keywords associated with the one or more contextual personality labels. The method provides a plurality of keywords of the set of keywords as a prompt to a large language model to automatically generate a text template to be included in a corpus of content for delivery in association with the one or more contextual personality labels. The method selects the automatically generated text template as at least part of the particular content for which delivery is caused to the second active user.

In various aspects, a system is provided that includes one or more data processors and a non-transitory computer-readable storage medium containing instructions which, when executed on the one or more data processors, cause the one or more data processors to perform part or all of one or more methods disclosed herein.

In various aspects, a computer-program product is provided that is tangibly embodied in a non-transitory machine-readable storage medium and that includes instructions configured to cause one or more data processors to perform part or all of one or more methods disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure.

DETAILED DESCRIPTION

Figure 1:
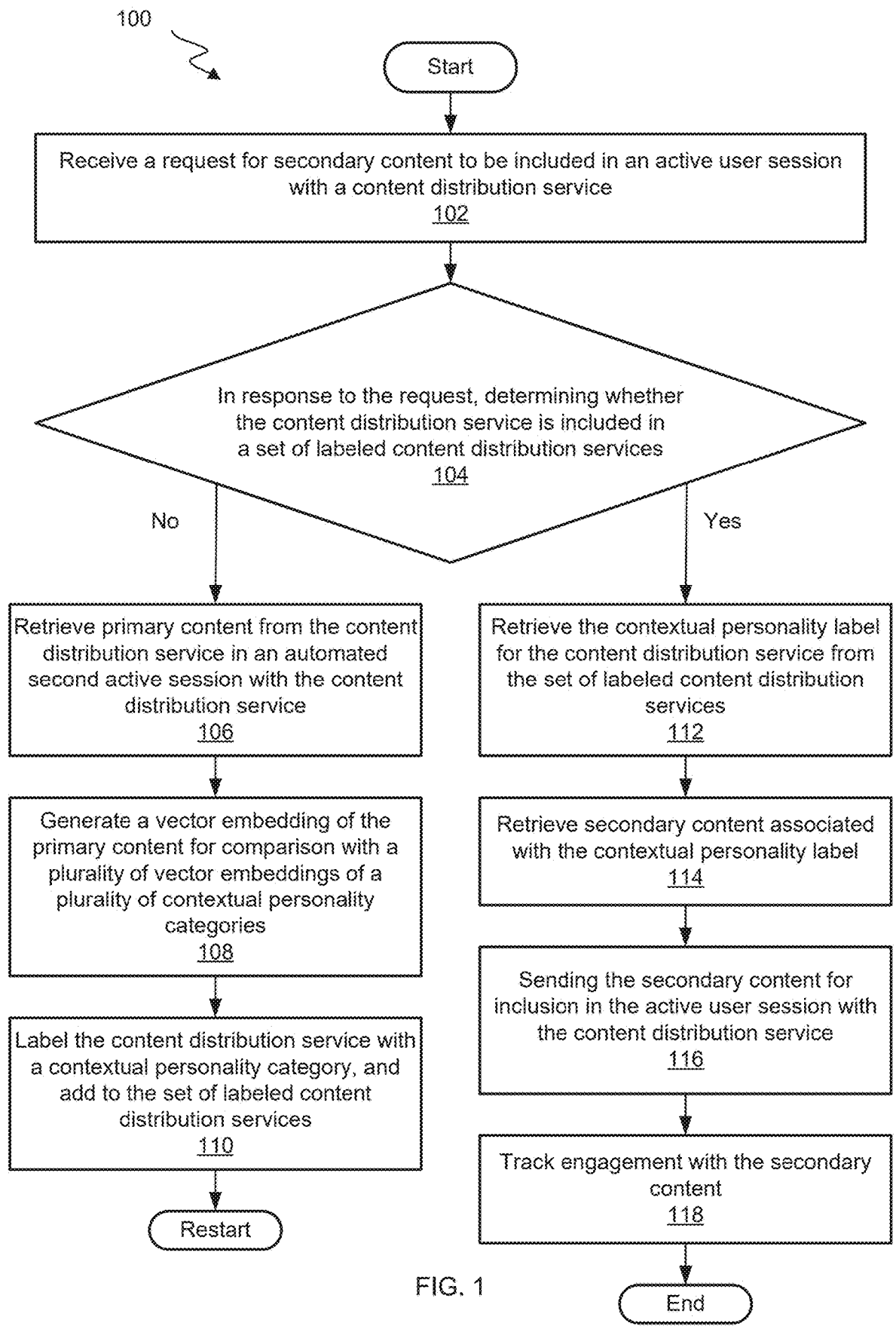
FIG. 1 illustrates a flow chart depicting an example process for selecting secondary content for inclusion with primary content based on a contextual personality of the primary content.

A content manager selects secondary content for inclusion with primary content being delivered as part of an active user session, for example, with a web site. If a source of the primary content has not been classified, a classifier generates a vector embedding of the primary content for comparison with vector embeddings of contextual personality categories. The source of the primary content is labeled with a contextual personality category based on the comparison, and the labeled source is added to a set of labeled sources for use in providing targeted secondary content for inclusion in active user sessions. In various embodiments, the process is implemented using non-transitory computer-readable storage media to store instructions which, when executed by one or more processors of a computer system, cause receiving information identifying a source of primary content and selecting secondary content for inclusion with the primary content based on a contextual personality of the primary content. The process may be implemented on a cloud-based or local computer system that includes processors for receiving information identifying a source of primary content and selecting secondary content for inclusion with the primary content based on a contextual personality of the primary content. The computer system may communicate with other server or client computer systems for displaying the primary content and secondary content together.

A description of the technique for selecting secondary content for inclusion with the primary content based on a contextual personality of the primary content is provided in the following sections:
- REAL-TIME DELIVERY OF SECONDARY CONTENT
- DETERMINING PERSONALITY CONTEXT OF PRIMARY CONTENT.
- PERSONALITY-TARGETED CONTENT DELIVERY.
- UPDATE AUDIENCE BASED ON CONTENT DELIVERY CONTEXT
- UPDATE CONTENT DELIVERY CONTEXT BASED ON AUDIENCE.
- TRACKED ENGAGEMENT OF PERSONALITY-TARGETED CONTENT.
- UPDATING PERSONALITY LABELS FOR SECONDARY CONTENT
- GENERATING CONTENT TO MATCH PERSONALITY LABELS The steps described in individual sections may be started or completed in any order that supplies the information used as the steps are carried out. The functionality in separate sections may be started or completed in any order that supplies the information used as the functionality is carried out. Any step or item of functionality may be performed by a personal computer system, a cloud computer system, a local computer system, a remote computer system, a single computer system, a distributed computer system, or any other computer system that provides the processing, storage and connectivity resources used to carry out the step or item of functionality.

Real-Time Delivery of Secondary Content

Web sites of primary content such as articles, blogs, storefronts, etc., may include scripts for placing secondary content in designated areas, such as banners at the top or bottom, or panes along the sides of the sites. Web site owners may choose to place these scripts on their sites as a result of being required by the web site platform as part of building the site, as is done by some free hosting platforms, or in order to gain revenue from the high traffic on their site. Billions of web sites include such scripts for placing secondary content, and these websites otherwise provide all types of primary content from all angles, perspectives, and exhibiting or appealing to all kinds of personalities. Other media sources also have placeholders for placing secondary content, including, but not limited to, applications, streaming services, television media, radio (in the form of audio placeholders), podcasts (in the form of audio placeholders), etc.

A website containing an embedded script to fetch secondary content triggers the embedded script when the website is loaded. The script makes a call to a content manager to retrieve secondary content for placement into a designated area of the website, and the secondary content is returned to the server or client for inclusion in the website content that is delivered to the user, for example, in a client browser.

In another embodiment, the script makes a first call to a classifier to classify the primary content with one or more categories and a second call to a content manager to retrieve secondary content for the one or more categories. The result of the first call triggers secondary content to be included based on the provided one or more categories.

The website content is viewed, and the user may interact with the primary content and/or the secondary content with little or no discernible difference between when the primary content and secondary content were loaded, how they were delivered, or even which content is the primary content or the secondary content. As the user was already planning to consume the primary content by visiting the site, the secondary content provider benefits from having the user see the secondary content at the same time, concurrently with the primary content, as this increases the likelihood that the user will also or even alternatively consume the secondary content.

In order for the secondary content to be displayed concurrently with the primary content, constraints of content delivery channels contribute to restrictions on how long the selection and delivery of the secondary content can take. Web sites and other channels are optimally configured to deliver the primary content for which the web site was developed, whether it is a storefront or a news article. If the web sites takes longer than 1-3 seconds to load, as much as 50% or more of the users may be lost as unwilling to wait for the content, depending on the site. If the content takes more than 50 seconds to load, the average user has likely already finished consuming the content of the site and is ready to move on, depending on the site. For these reasons, in order for secondary content providers to agree to compensate primary content providers for payment to place the secondary content on the site, the secondary content providers prefer reassurance that the secondary content was placed in front of a candidate consumer viewing the site for a minimum amount of time needed for the content to be considered consumed. Otherwise, the process of selecting secondary content, delivering the secondary content, and mixing the delivered secondary content with the primary content is wasted. Secondary content providers are unwilling to pay for secondary content placement that will not have time to be consumed.

Under such strict use case constraints, the content manager is tasked with matching the primary content with the closest or highest-compensating secondary content and providing the secondary content for consumption in real-time while the page loads, typically in milliseconds or in under a second. A script call from the web site, such as a JavaScript call, invokes an API offered by the content manager. The invocation of the API identifies the site and requests secondary content for inclusion on the site and/or a category for identifying secondary content. The content manager processes the API call to determine whether secondary content is already designated for the site. If not, the content manager matches secondary content with the site based on topics, consumer types, sentiments, brand safety, carbon emissions, disinformation content, and/or personalities associated with the primary content, but the content manager may not have the luxury of parsing the primary content in real-time before the content delivery window has expired. The content manager may inspect the cached information about the site to determine the closest available secondary content known for the primary content, and trigger an extended process of updating information about the primary content if the cached information is not precise enough or accurate enough in light of the traffic of secondary content being delivered via the site.

Applications, streaming services, and/or television media may include similar opportunities for secondary content placement, interleaving the secondary content with the primary content being delivered by the applications, streaming services, and/or television media to increase a likelihood that the secondary content will be consumed. Radio and podcasts may include audio placeholders for interleaving audio content with a primary content stream. The audio, video, or streaming content may be converted to text and parsed to determine categories or characteristics of the primary content for placing relevant secondary content into these placeholders. These scenarios with other media include similar time constraints as consumers interested in the content may change over time, and there are a limited amount of resources and limited time to devote to a single consumer of the resources at any given moment.

In some embodiments, a content manager of a content distribution service may deliver a best available item of secondary content in a first active user session while performing additional, more resource-intensive matching for future user sessions. The additional, more resource-intensive matching may include retrieving the content from the primary content provider for further analysis, and storing results of that further analysis in a profile of the site, a graph of sites, or any other data structure that logs characteristics detected on the sites. The data structure may include weights and/or probabilities that characteristics are associated with the sites, with closer associations between the site and certain characteristics represented by higher weights or higher probabilities of the connection.

Determining Personality Context of Primary Content

In various embodiments, the primary content is parsed to determine additional characteristics such as topics, consumer types, sentiments, brand safety, carbon emissions, disinformation content, and/or personalities associated with the primary content, for the example purpose of determining which consumers might be interested in the primary content or for the example purpose of learning more about consumers who have already shown an interest in the primary content. Example topics may differentiate "sports" versus "news" versus "wellness" or other topics, from an Interactive Advertising Bureau (IAB) taxonomy or graph, based on the primary content or a source of the primary content. Example consumer types include, but are not limited to, business consumers such as companies buying in bulk, conscientious consumers such as problem-solving individuals, discretionary spending consumers that spend extra money based on wants rather than needs, discount consumers that are in search of a deal, impulsive consumers that make impulsive buying decisions, loyal consumers that stick to the same brands, budgeted consumers that make long-term planned spending decisions, open consumers that look for innovative goods or services, and/or seasonal consumers that purchase certain goods or services at certain times of the year. Example sentiments include, but are not limited to, negative, neutral, or positive sentiments as mapped to different combinations or patterns of text. Examples of brand safety include, but are not limited to, primary content sources that are not subject to extreme negative sentiment or potentially illegal activities. Examples of carbon emissions include, but are not limited to, determinations that are made based on the web hosting service, shipping services, and/or goods or services offered based on primary content. For example, the carbon footprint of shipping large new appliances is greater than the carbon footprint of shipping parts for appliances. Examples of disinformation content includes information that has been determined, via a fact-checking service, to be false, and may pose a risk for any secondary content that is placed in association with the disinformation content. Example Personalities include, but are not limited to, the Big 5 personality traits (neuroticism, extraversion, openness to experience, agreeableness, and conscientiousness) or any other personality characteristics that describe how a consumer thinks about or approaches a variety of topics. Any combination of one, two, or more of these characteristics may be included in a graph that aligns web site content with expected consumer behavior and/or otherwise describes or predicts consumer behavior, for example, as relating to a website or other communication.

There are many different candidate personalities or persona schemas, and different personalities and persona schemas are associated with different consumer behaviors. Aligning content with consumer personalities increases the engagement with the content by consumers as a measurable improvement in content delivery. Categories of different personalities are also called personality segments, and secondary content may be placed on sites aligned with specific personality segments such that the personality segments of the sites align with the personality segments of the secondary content being placed on the sites.

Scientific research has shown that personality segments indicate consumer propensity for impulsive buying, compulsive buying, hedonic consumption, and/or utilitarian shopping. Impulsive buying is the sudden urge to make a purchase. Compulsive buying occurs when a consumer makes purchases for the sake of making purchases, based on a feeling that consumption must occur. Hedonic consumption is based on the emotional and psychological value such as excitement or joy that comes from shopping. Utilitarian shopping is purpose-driven shopping to solve a problem.

These general consumer behaviors are linked to different personalities with varying degrees. Personality traits such as the Big 5 personality traits (neuroticism, extraversion, openness to experience, agreeableness, and conscientiousness), for example, have been shown to predict compulsive buying, impulsive buying, hedonic values, and/or utilitarian values to different degrees with different consumers. Additional personality traits are useful when analyzing branded content targeted towards consumers, such as sincerity, competence, excitement, sophistication, and ruggedness. Other personalities may be applied and defined for specific brands or in specific contexts where brand owners have found use in distinguishing their brand's personality from other brands' personalities. When combined with emotions such as positive or negative feelings towards a topic, to varying degrees, personalities can be even more predictive of consumer behavior. Brand loyalty or loyalty to ideals (e.g., carbon efficiency) and other factors may also increase the predict-ability of consumer behavior. A consistent appeal to personality may strengthen a brand's personality and strengthen the effectiveness of content delivered to candidate consumers of the content, promoting engagement with the content and/or downstream activities such as the purchases of goods or services featured in the content.

In various embodiments, contextual personality and sentiment segments may be combined with characteristics of groups of candidate consumers to determine consumer types, affinities of the groups with various types of content, at various levels of engagement or conversion with various content, products, and/or services, and affinities of the groups with brands and brand personalities. These insights offer distributors of secondary content the ability to target candidate consumers with relevant content, products, and/or services.

Candidate consumers may be grouped based on one or more attribute values or ranges, and these attribute values or ranges may serve to define the group. A consumer type may be determined by deriving personality and sentiment from primary content that is consumed and associating the personality and sentiment from the primary content back to the consumer of the primary content. The personality and sentiment may also be determined for primary content that is consumed by associating personality and sentiment from the consumer types of consumers of the primary content to the primary content's personality and sentiment.

Groups of candidate consumers may have an affinity with certain content types or brands based on personality types of the groups. Brands may be defined not just by their products but also by the content associated with the brands. Using personality types to segment groups of candidate consumers helps identify consumers with similar needs, wants, and product responses using psychographics. Using the personality types for content delivery, candidate consumer segmentation, and candidate consumer outreach influences behavior of the candidate consumers. For example, extraversion and conscientiousness are significant predictors of loyalty of candidate consumers to brands, and together with the emotions of joy, gratefulness, and stress, these personality types may predict, in the example, about 10% of the variance in loyalty of the candidate consumer.

Contextual personality segments may be used to identify target content, to identify target consumer types, to infer consumer types from content consumption, to infer consumer types from downstream activity such as purchasing behaviors, and/or to predict content consumption and/or downstream activity such as purchases. Determined personalities may have an attraction or affinity with certain content, may inform the consumer type and/or otherwise be positively or negatively associated with certain sentiments, topics, or consumer types.

In various embodiments, a content manager provides a user interface to select contextual personality segments for identifying target primary content for placement of secondary content and/or target candidate consumers for outreach, such that the targets are associated with the contextual personality segments. Example selectable contextual personality segments include, but are not limited to, adventurousness, altruism, ambition, anxiety, assertiveness, boldness, carefree, cautiousness, challenging, cheerfulness, contentment, contrary, cooperative, creative, detached, disorganized, dutifulness, emotional intelligence, empathetic, energetic, excitement-seeking, extrovert, friendliness, gregariousness, etc. Combinations of contextual personality segments and/or other segments may be selected to identify relevant content with an affinity for the contextual personality segment, and/or to target candidate consumers who overlap with a contextual personality segment. Combinations may be determined based on an intersection between datasets (whether content sources associated with the segments or candidate consumers associated with the segments) identified by each of the separate characteristics being combined.

The interface provided by the content manager may provide an option for a secondary content provider to select a primary content site or group of primary content sites for regularly placing secondary content. The content manager may receive a query that searches for primary content associated with adventurous eaters and conservative dressers. The content manager may break the query up into two parts: (1) adventurous eaters primary content and (2) conservative dressers primary content. The content manager may then search for pages that match food or eating topics and adventurous personality to determine a first set of pages, and the content manager may search for pages that match clothing or dress topic and conservative personality type to determine a second set of pages. The content manager may then determine a content source intersection between the first set of pages and the second set of pages to find pages that have included content that is directed to both adventurous eaters and conservative dressers. In one embodiment, the content source intersection is a parent site that offers a variety of content at various times, such as dated articles or blogs. In another embodiment, the content source intersection is an item of primary content such as a specific article, landing page, or company site that offers content in the specific combination of categories.

In a further embodiment, sentiment may be added to the query to include content sources having positive sentiment, for example. The combination of content sources may be further reduced to include only those pages that exhibit positive sentiment.

In another embodiment, a content manager provides an interface to select a variety of combinations of characteristics, and an audience may be determined not by the people who have all of the characteristics but based on candidate consumers who have visited pages that, collectively, exhibit all of the characteristics. For example, the content manager may receive a query that searches for adventurous eaters and conservative dressers. The content manager may break the query up into two parts: (1) adventurous eaters and (2) conservative dressers. The content manager may then search for a first set of pages that match food or eating topics and adventurous personality to determine a first group of candidate consumers that visited pages from the first set, and the content manager may search for a second set of pages that match clothing or dress topic and conservative personality type to determine a second group of candidate consumers that visited pages from the second set. The content manager may then determine an audience intersection between candidate consumers that viewed the first set of pages and candidate consumers that viewed the second set of pages to find an audience of candidate consumers who are both adventurous eaters and conservative dressers.

Contextual personality segments may be mapped to consumer types, context sentiment, context topical categories, and potentially combined with audience attributes to derive (a) consumer types with affinities, (b) affinities to content, products, and/or services, (c) affinities to brands and, in turn, brand personalities. The contextual personality segments may be used to align content delivered in association with certain brands to target compatible candidate consumers.

In one example, a segment Adventurousness uses contextual terms around extreme sports, adventure travel, physical challenges, etc. The segment is associated with a known consumer type, and a graph is generated to associate the consumer with URLs or content based on these contextual terms. Candidate consumers may also be associated with the consumer type based on consumption of the content using these contextual terms.

FIG. 1 illustrates a flow chart depicting an example process 100 for selecting secondary content for inclusion with primary content based on a contextual personality of the primary content. As shown in FIG. 1, in block 102, a request is received for secondary content to be included with primary content of a content distribution service, for example, a web site. In response to the request, in block 104, a classifier determines whether the site is included in a set of labeled sites. After determining that the site is not included in the set of labeled sites, in block 106, the classifier may retrieve the primary content from the site in a new automated session by navigating to the site and downloading the primary content from the site. In block 108, the classifier may then generate vector embedding(s) of the primary content for comparison with contextual embeddings from contextual personalities to select contextual personality label(s). Each of the contextual embeddings for the contextual personalities is determined from content items that have been associated with corresponding contextual personalities. In block 110, the site may then be added to the set of labeled sites in association with the contextual personality label(s) once the contextual personality label(s) have been selected for the site.

Figure 2:
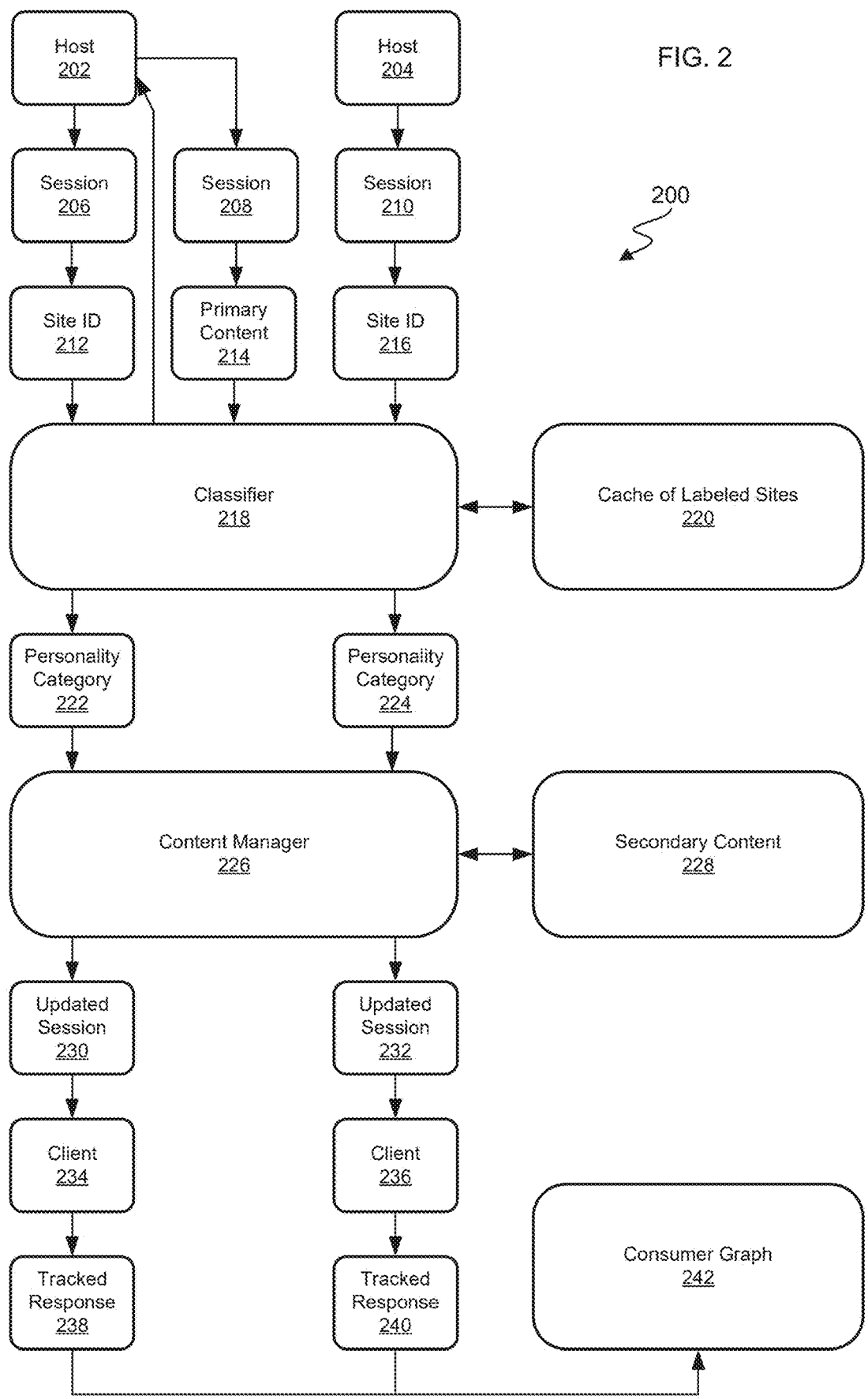
FIG. 2 illustrates a diagram of an example system for selecting secondary content for inclusion with primary content based on a contextual personality of the primary content.

FIG. 2 illustrates a diagram of an example system 200 for selecting secondary content for inclusion with primary content based on a contextual personality of the primary content. As shown in FIG. 2, a client 234 starts a session 206 with host 202, and session 206 triggers site ID 212 to be sent to classifier 218. Classifier 218 receives site ID 212 and checks cache of labeled sites 220 to determine if site ID 212 is present or not. If not present, classifier 218 may also check a back-end database (not shown) if site ID 212 is present. If classifier 218 cannot find site ID 212 among the labeled sites, classifier 218 begins a session 208 with host 202 to retrieve primary content 214 from host 202. Primary content 214 is parsed, and vector embeddings from primary content 214 are used to classify site ID 212 with a personality category 222, which may also be stored in cache of labeled sites 220. Content manager 226 uses personality category 222 to select secondary content 228 for inclusion in updated session 230, which now reflects primary content delivered in session 206 (similar to primary content 214 but as delivered to client 234), as well as secondary content 228 delivered to client 234. For example, client 234 may include a browser that retrieves content from multiple sources, one of which is host 202 and another of which is a server including classifier 218 and content manager 226. Candidate consumer interactions or responses 238 are tracked in updated session 230 with client 234, and any such interactions or responses 238 may be used to update consumer graph 242.

In another path shown in FIG. 2, a client 236 starts a session 210 with host 204, and session 210 triggers site ID 216 to be sent to classifier 218. Classifier 218 receives site ID 216 and checks cache of labeled sites 220 to determine if site ID 216 is present or not. If not present, classifier 218 may also check a back-end database (not shown) if site ID 216 is present. If classifier 218 finds site ID 216 among the labeled sites, the found labeled site is used to classify site ID 216 with a personality category 224, which may also be stored in cache of labeled sites 220. Content manager 226 uses personality category 224 to select secondary content 228 for inclusion in updated session 232, which now reflects primary content as delivered in session 210 as well as secondary content 228 delivered to client 236. For example, client 236 may include a browser that retrieves content from multiple sources, one of which is host 204 and another of which is a server including classifier 218 and content manager 226. Candidate consumer interactions or responses 240 are tracked in updated session 232 with client 236, and any such interactions or responses 240 may be used to update consumer graph 242.

The classifier may match the primary content against vector embeddings generated from different sets of sites. For example, the classifier may make a first determination of whether the primary content has keywords of a first set of keywords associated with a first contextual personality label for a set of sites and a second determination of whether the primary content has keywords of a second set of keywords associated with a second contextual personality label associated with a second set of sites. As a result of the first and second determinations, the site label for the primary content may include a contextual personality label associated with the first set or the second set of sites and exclude a contextual personality label associated with another of the first or second set of sites. For example, the cosine distance between the term embedding vector of the primary content may be closer to a term embedding vector of one set of sites or the other, and the contextual personality label associated with the closer set of sites may be selected for the label.

In one embodiment, seed example content is built for each personality type of a plurality of personality types, and a classifier uses vector embeddings constructed from the seed content to classify new content. The seed example content is used to discover candidate consumers associated with the personality type, and the candidate consumers and/or the example content may be used to discover other example content and/or candidate consumers associated with the personality type.

A list of seed terms may be developed that relate to individual personality types based on synonyms and other words that are frequently used to describe the personality type in the psychological context. Another list of seed terms may be developed as examples of content that a person having that personality type may consume. For example, adventurousness personality type may include keyword examples of rafting, rock climbing, etc., and an openness personality type may include keyword examples of design, creativity, and inspiration.

Personalities and/or emotions may be determined prevalent for a source based on content conveyed by the source. For example, some sources may convey information that appeals to conscientious personality types, as compared to lax or disorganized personality types. Sources that may appeal to conscientious personality types include sources that appeal to science, reason, or deliberation, as compared to a quick laugh, a random story, or an unsupported opinion. As another example, sources may convey information that appeals to extraversion personality types, as compared to those with introverted or isolated personality types. Sources that may appeal to extraversion may include sources that appeal to social opportunities, peer reviews, activities, and experiences, as compared to isolated projects and fact-intensive compilations.

The pages may be detected for different personality categories based on a rarity of keywords, phrases, or content associated with those categories among all pages and a frequency of the words in the individual pages. In a particular embodiment, each page is scored for each term based on term frequency (e.g., occurrences of words in the document) multiplied by the inverse of the document frequency (e.g., the rarity of words among the documents).

In one embodiment, the personality segments are archetypal and do not have a one-to-one relationship with individual behaviors. The approach therefore maintains the anonymity and privacy of users.

Once pages have been categorized into different personality categories, additional terms, such as trending terms or other updated terms, may be discovered for the personality categories based on how frequently the terms appear across the pages in the category and/or how infrequently the terms appear across the pages in other categories. Personality categories may have hundreds or thousands of mapped terms as a result of seed terms, seed pages, and discovery of additional terms. These terms, if present in a page, serve as indicators, with some terms being stronger indicators than others (i.e., more unique to the particular personality category), that the page is in the particular personality category.

Tables 1-3 below show example mappings of personality types to example content using "example URLs" that were selected based on personality and other characteristics combined into a persona. The relevant terms for each consumer persona or combination of characteristics were extracted from the example URLs based on term frequency multiplied by inverse document frequency among the example documents selected for all personas. The relevant terms are more unique to the combination of characteristics for which they are listed than they are for other combinations of characteristics. These relevant terms may be used to construct a vector embedding that describes whether such terms are present in a text, and, if so, how frequently they occur in the text, with different term vectors mapped to different combinations of characteristics.

As shown in Table 1, a topic is provided in the "IAB Category" column and has been combined with a Big 5 Personality to form a named "Consumer Persona" that can be referenced as shorthand and selected to identify candidate sites for placing secondary content and/or candidate consumers for additional outreach. The persona is mapped to several example URLs that, collectively, capture the intended meaning, and the relevant terms are extracted based on term frequency multiplied by inverse document frequency from the primary content pulled from the example URLs as the documents.

TABLE 1

Example mappings of personality types to example content

| IAB Category | Big 5 Personality | Consumer Persona | Relevant Terms | Example URLs |
|---|---|---|---|---|
| Arts & Entertainment | Openness | Creatives | Art, Design, Culture, Fashion, Music, Film, Literature, Photography, Theater, Performance, Creativity, Innovation, Inspiration, Aesthetics | https://www.artsy.net/, https://www.behance.net/, https://www.designboom.com/, https://pitchfork.com/, https://www.vogue.com/ |
| Travel | Extraversion | Adventurers | Adventure, Exploration, Discovery, Nature, Outdoors, Fitness, Wellness, Tourism, Sightseeing, Travel, Food, Culture, History, Experience | https://www.lonelyplanet.com/, https://www.nationalgeographic.com/travel/, https://www.travelandleisure.com/, https://www.airbnb.com/, https://www.tripadvisor.com/ |
| Technology | Conscientiousness | Innovators | Artificial Intelligence, Big Data, Cloud Computing, Cybersecurity, Internet of Things, Machine Learning, Robotics, Virtual Reality, Gadgets | https://www.wired.com/, https://www.techcrunch.com/, https://www.theverge.com/, https://www.cnet.com/, https://www.gizmodo.com/ |
| Society | Agreeableness | Humanitarians | Charity, Philanthropy, Social Justice, Equality, Diversity, Inclusion, Human Rights, Environment, Sustainability, Community, Empathy | https://www.unicef.org/, https://www.greenpeace.org/, https://www.hrw.org/, https://www.amnesty.org/, https://www.charitywater.org/ |
| Lifestyle | Neuroticism | Self-Improvers | Health, Fitness, Nutrition, Self-help, Personal Growth, Relationships, Mindfulness, Spirituality, Beauty, Fashion, Home, Family | https://www.self.com/, https://www.mindbodygreen.com/, https://www.huffpost.com/life/topic/healthy-living, https://www.thecut.com/, https://www.refinery29.com/ |

As shown in Table 2, a Big 5 Personality is combined with a topic, listed in the "IAB Category" column, to form a named "Consumer Persona" that can be referenced as shorthand and selected to identify candidate sites for placing secondary content and/or candidate consumers for additional outreach. Additional characteristics of the consumer persona are listed as metadata that guided finding the example URLs, for example, via a Web search. The additional characteristics may also be provided in a user interface as metadata about the persona to provide a richer understanding of the target sites or consumers covered by the persona. The persona is mapped to several example URLs that, collectively, capture the intended meaning, and the relevant terms are extracted based on term frequency multiplied by inverse document frequency from the primary content pulled from the example URLs as the documents.

TABLE 2

Example mappings of personality types to example content

| Big 5 Personality | Consumer Persona | Characteristics | IAB Category | Relevant Terms | Example URLs |
|---|---|---|---|---|---|
| Openness to Experiences | Innovators/ Explorers/ Creatives/ Thinkers | Curious, creative, early adopters of new products, seek novelty and experiences | Technology and Computing | Artificial Intelligence, Big Data, Virtual Reality, Internet of Things, Machine Learning, Cybersecurity, Cloud Computing, Blockchain | https://www.wired.com/, https://www.techcrunch.com/, https://www.theverge.com/, https://www.cnet.com/, https://www.gizmodo.com/ |
| | | | Arts and Entertainment | Film, Music, Literature, Fine Art, Performance Art, Theatre, Dance, Architecture, Design | TheGuardian.com, RollingStone.com, Pitchfork.com, ArtNet.com, Dezeen.com |
| | | | Travel | Adventure, Exploration, Culture, Food, Heritage, Nature, Leisure, Accommodation | LonelyPlanet.com, NationalGeographic.com, TravelandLeisure.com, CondeNastTraveller.com, Booking.com |
| Conscientiousness | Achievers | | Business and Finance | Entrepreneurship, Finance, Investment, Stock Market, Business Strategy, Corporate Culture, Management, Accounting | Forbes.com, Entrepreneur.com, Inc.com, WSJ.com, Bloomberg.com |
| | | | Health and Fitness | Nutrition, Fitness, Wellness, Yoga, Running, Strength Training, Meditation, Mental Health | Healthline.com, FitnessMagazine.com, MyFitnessPal.com, MindBodyGreen.com, PsychologyToday.com |
| | | | Home and Garden | Home Improvement, Gardening, Interior Design, DIY, Home Automation, Real Estate | HGTV.com, Houzz.com, ApartmentTherapy.com, TheSpruce.com, Realtor.com |
| Extraversion | Social Butterflies | | Hobbies and Interests | Gaming, Social Media, Photography, Reading, Writing, Dancing, Cooking, Crafts | Reddit.com, Instagram.com, GoodReads.com, Pinterest.com, AllRecipes.com |
| | | | Sports | Football, Basketball, Baseball, Golf, Tennis, Running, Cycling, Swimming | ESPN.com, BleacherReport.com, GolfDigest.com, RunnerWorld.com, Bicycling.com |
| | | | News and Politics | Current Affairs, Politics, World News, Local News, Economics, Environment, Climate Change, Immigration | CNN.com, NYTimes.com, BBC.com, AlJazeera.com, Economist.com |
| Agreeableness | Traditionalists | | Food and Drink | Restaurants, Recipes, Cooking Tips, Wine, Beer, Spirits, Healthy Eating, Desserts | Epicurious.com, AllRecipes.com, FoodNetwork.com, BonAppetit.com, WineEnthusiast.com |

TABLE 2-continued

Example mappings of personality types to example content

| Big 5 Personality | Consumer Persona | Characteristics | IAB Category | Relevant Terms | Example URLs |
|---|---|---|---|---|---|
| | | | Religion and Spirituality | Faith, Worship, Spirituality, Self-Help, Meditation, Mindfulness, Personal Growth, Yoga | Beliefnet.com, SpiritualityandPractice.com, PsychologyToday.com, MindBodyGreen.com, TheHuffingtonPost.com |
| | | | Shopping | Fashion, Beauty, Home Decor, Gifts, Jewellery, Retail Industry, Online Shopping, Discounts | Sephora.com, Amazon.com, Etsy.com, Nordstrom.com, Refinery29.com |
| Neuroticism | Stress-Prone | | Health and Fitness | Nutrition, Fitness, Wellness, Yoga, Running, Strength Training, Meditation, Mental Health | Healthline.com, FitnessMagazine.com, MyFitnessPal.com, Mind |

As shown in Table 3, a Personality is combined with a topic, listed in the "IAB Category" column, to form a named "Consumer Persona" that can be referenced as shorthand and selected to identify candidate sites for placing secondary content and/or candidate consumers for additional outreach. The persona is mapped to a single example URLs that best captures the intended meaning, and the relevant terms are extracted based on term frequency multiplied by inverse document frequency from the primary content pulled from the example URLs as the documents. The single URL and relevant terms may be expanded by performing a search, based on the relevant terms, for additional example URLs, and extracting relevant terms from the additional example URLs based on term frequency multiplied by inverse document frequency.

TABLE 3

Example mappings of personality types to example content

| Personality | Consumer Persona | IAB Category | Relevant Terms | Example URLs |
|---|---|---|---|---|
| Openness | Creatives | Arts & Entertainment | art, music, theater, literature, film, dance, design, creativity, innovation, aesthetics, inspiration, imagination, culture, expression, originality, imagination, fantasy, surrealism, avant-garde, abstract, experimental, minimalism, conceptual, installation, contemporary art, postmodernism, digital art, interactive art, virtual reality, augmented reality, experimental music, multimedia, video art, sound art, new media art, audiovisual, performance art, graffiti, street art, pop art | https://www.artsy.net/ |

TABLE 3-continued

Example mappings of personality types to example content

| Personality | Consumer Persona | IAB Category | Relevant Terms | Example URLs |
|---|---|---|---|---|
| | Innovators | Technology and Computing | Artificial Intelligence, Big Data, Virtual Reality, Internet of Things, Machine Learning, Cybersecurity, Cloud Computing, Blockchain | |
| Conscientiousness | Achievers | Travel Business | career, work, success, achievement, ambition, leadership, management, entrepreneurship, innovation, productivity, efficiency, finance, economics, marketing, branding, business strategy, human resources, project management, operations management, supply chain management, business development, negotiations, decision making, time management, professionalism, organizational skills, collaboration, teamwork, business networking, customer service, sales | https://www.forbes.com/ |
| Extraversion | Social Butterflies | Hobbies & Interests | travel, sports, parties, concerts, festivals, nightlife, food, drink, fashion, beauty, wellness, fitness, adventure, outdoor activities, nature, pets, hobbies, collectibles, games, socializing, communication, public speaking, entertainment, leisure, culture, diversity, relationships, self-improvement, personal growth, spirituality, motivation, positivity, happiness | https://www.lonelyplanet.com/ |
| Agreeableness | Altruists | Society | charity, volunteering, philanthropy, social justice, diversity, equality, human rights, activism, | https://www.charitynavigator.org/ |

TABLE 3-continued

Example mappings of personality types to example content

| Personality | Consumer Persona | IAB Category | Relevant Terms | Example URLs |
|---|---|---|---|---|
| | | | community, public service, environmentalism, sustainability, ethics, morality, spirituality, wellness, mental health, parenting, education, personal development, relationships, empathy, compassion, kindness, generosity, altruism, collaboration, teamwork, communication | |
| Neuroticism | Worriers | Health & Wellness | anxiety, stress, depression, therapy, counseling, self-help, mindfulness, meditation, yoga, fitness, nutrition, sleep, relaxation, well-being, mental health, physical health, disease prevention, alternative medicine, addiction, recovery, rehabilitation, medical treatment, pharmaceuticals, healthcare industry, personal care products | https://www.healthline.com/ |

Keywords and content from the example sources in specific categories may be used to build a graph that indicates how likely different sources are to cause engagement for different personality types. The graph may be specific to individual sources or generic with respect to a representative vector of content from the group of sources to which an individual source is mapped.

In one embodiment, Word2Vec is used to detect word embeddings of the pages in the different personality categories, such that each of the personality categories may be associated with different representative vectors of words and their associated meanings that are common for the personality category. Other pages may be discovered using Word2Vec on existing pages labeled with a category to discover new pages that have not yet been labeled with a category, and new words may be discovered using Word2Vec on the new corpus of pages associated with the category after adding pages, in an iterative manner.

A classifier may receive millions or even billions of new pages daily that are reported as being visited by consumers, many of which may have not yet been categorized. A Word2Vec vector of the content of the new pages may be constructed to represent the occurrence and meaning of words in the new pages. In order to construct the vector, the content of the new page may be retrieved in a separate session between the content manager and the site, as the original content consumption was detected between a consumer and the site. The classifier may know the site URL and the identity of the site but likely does not have the full contents of the site based on the initial report of which consumers viewed the site. The separate retrieval of the content of the site by the classifier allows the classifier to view the site as if the classifier were a consumer, to process content that the consumer would have seen when visiting the site.

In one embodiment, the separate retrieval of the content of the site by the content manager occurs in parallel with a consumer session with the site. Once the classifier detects that a consumer is viewing a site that has not yet been categorized, the classifier may load the site and ingest text from the site for the purpose of categorizing the site among a plurality of categories, such as a personality type for the site, based on a Word2Vec vector representation of the category and a Word2Vec vector representation of the site. The classifier may experience an error in loading the site, such as a 404 (site not found) error, a 504 (gateway timeout) error, or any other error that a client may experience when loading a site. The classifier may need to retry or queue the site for retries of loading the site's contents to determine a category for the site. To protect the classifier, the site may be blocked from autoloading the site, via a blacklist of sites, if the site contains malware or content that is otherwise designed to interfere with the functioning of the content manager. The site may be ingested as the consumer is also viewing the site, such that the classifier can learn of which personality the site most closely represents in real-time, e.g., in milliseconds or in under a second, to serve up content associated with the corresponding personality.

This process of ingesting a new site into a vector may include removing, from the site, any content that would not be rendered in the user interface of a consumer, such as meta tags on the site aimed at achieving higher traffic, scripts, HTML tags and tag identifiers, function names, comments, window, frame, or section names, etc. After the process, raw text displayed on the website, for example, as rendered in a browser, may remain for analysis, and non-rendered components may be excluded.

A classifier may search the existing data available for personalities, topics, and/or other categories to determine which personalities, topics, sentiment, consumer type, and/or other categories best match the new site. In one embodiment, the classifier may match the new pages to a representative Word2Vec vector of a personality type, among a plurality of vectors representative of a plurality of personality types, based on a distance between the new page's vector and the representative vectors. The new page may be added to a personality category that has a representative vector embedding that best matches the vector embedding of the new page. In one embodiment, a new page may be matched to a plurality of personality categories if the new page's vector embedding is close enough to representative vector embeddings of the plurality of personality categories.

In a particular embodiment, the closeness of the new page's vector embeddings to the representative vector embeddings of personality categories may be measured using cosine similarity, which measures the cosine of the angle between the two vector embeddings, which is equal to the dot product of the vectors divided by the product of the vectors' lengths.

In another embodiment, Word2Vec is used to detect word embeddings of pages consumed by consumers that have also positively engaged with a brand (e.g., through purchases, subscription, creation of a user account, etc.). The word embeddings of the pages consumed by consumers who have also positively engaged with the brand may be used to classify the types of pages that are most frequently interacted with by consumers such as customers of the brand. The vectorized embeddings of the brand's pages may be compared with the vectorized embeddings of the personality pages to determine a brand personality or personalities for the brand that best match the brand's consumer page visits. In a further embodiment, the brand personality determined may be used to discover candidate consumers and candidate content sources that are not yet known to be associated with the brand.

In one embodiment, the graph accounts for embeddings of pages based on images, videos, and/or audio content in addition to textual content. The images, video, and/or audio content on the pages, whether already categorized or not with some categories, may be parsed and passed into a machine learning model for identifying text embeddings based on images, video, and/or audio content inputs into the machine learning model. The machine learning model may, for example, be a speech-to-text model for identifying textual content based on audio content, may be an image recognition model for identifying content from images, may be an image recognition model that operates on video content that includes a sequence of images, and/or may be a video content model that operates on audio transcriptions from the video. An output of the machine learning model may include additional embeddings of content on the site, and, if the page has been categorized in a category, those embeddings may form a part of the average or aggregate vector embedding for sites having the same category. If the page has not yet been categorized, the output may be used for matching against aggregate vector representations of pages that have already been categorized in different categories.

In an example, the classifier automatically generates a textual description of image data in the primary content to be classified. The textual description may be combined with other text parsed or otherwise determined for the primary content, and the combined textual description may be used to generate a vector embedding of the primary content. The classifier may then compare the vector embedding of the primary content with vector embeddings of different contextual personalities to determine a labeled contextual personality for the primary content at the exclusion of other labels of contextual personalities.

In one embodiment, text-based categorization occurs during a step of generating mappings between example sources of primary content and personality types. Once the text-based categorization occurs, different sets or groupings of consumers are determined that frequently view content having certain personalities. Then, the different sets or groupings of consumers may be used to refine the mappings between examples sources of primary content and personality types and/or to reach out to the different sets or groupings of consumers with information or content associated with the associated personality.

In one embodiment, the personality segments are added to a graph that includes edges between nodes representing consumers or groups of consumers and node representing personalities based on candidate consumer behavior, edges between nodes representing brands and nodes representing personalities based on how brands have been associated with certain content classified with certain personalities, and/or edges between nodes representing content sources and nodes representing personalities based on how closely the content from the content sources are associated with the personalities. The graph may then be refined as more data becomes available about brands, consumers, and/or content sources, and the graph may be used to identify consumers for certain input content, when targeting content for certain input consumers, or when targeting consumers and/or content for certain input brands and/or personalities, based on probabilities of associations represented by edges of the graph.

Once the graph is created, the graph may be consumed to connect any consumer categories, any brand, product, goods, or services categories, and/or any content categories to personality in a probabilistic manner. For example, a first graphed edge from consumer behavior A to personality B, and a second graphed edge from personality B to brand C may be used to estimate a third edge from consumer behavior A to brand C by combining the probability represented by the first graphed edge and the second graphed edge. In a particular example, if the first graphed edge has a weight of 50% and the second graphed edge has a weight of 40%, the estimated third edge may have an estimated weight of 20%. The graph's weight may indicate, for example, whether a consumer exhibiting behavior A is likely to lead to engagement with brand C, if exposed to content having personality B.

The predictiveness of certain edges between nodes may be capped at expert-determined maximums based on research. For example, a maximum predictiveness of personality on consumer behavior may be capped at 20% in one example if personality is known from research to be at best 20% predictive of consumer behavior, with other unknowns making up the remaining 80% of consumer behavior.

Other factors may also be taken into account and incorporated with the graph, each having a capped predictiveness that can be contributed by the factor. Other factors include, but are not limited to, topics covered in content consumed, sentiment conveyed by content consumed, quality of content, consumer type, account balances, credit scores, discussions and joint decisions with significant others, discussions with peers, peer pressure, social normative pressures, recent purchases, amount of time available to make a decision, etc. Any factor may be estimated based on facts gathered for a given consumer or group of consumers to incorporate into the graph and improve the overall predictiveness of consumer behavior.

In one embodiment, consumer behavior is measured without knowing which consumers clicked on or otherwise engaged with content. The consumer behavior may be determined based on purchase behavior or loyalty account logins that occurred as a result of the content. The content may include a unique tracking identifier that remains in the consumer's session to a point where the consumer logs in to make a purchase, enters their shipping address, accepts cookies or logged history data in the session, or otherwise identifies herself or himself to obtain a benefit offered by the service, such as one offered by the content provider. At that point, the unique identifier may be used to determine which content was served to the consumer. An identity of the consumer, such as an email address, IP address, user ID, loyalty ID, or account ID, or other information uniquely identifying the consumer may be used to match the content delivery and consumer activity to a profile in an identity graph that stores consumer activity, consumer profiles, and probabilistic relationships between consumer profiles and activity that has not yet been uniquely mapped to an individual consumer, and, in the identity graph, store an inference of what personality or other characteristics are appealing to the consumer for use when the identity graph is analyzed to optimize content characteristics for future content delivery.

In one embodiment, the identity graph may be updated similarly for thousands or millions of users that consumed content in a session and later identified themselves in the same session. The identity graph may then show which sites were visited by which individuals, which terms are most prevalent and unique to the sites visited, and which personalities and/or topics are embodied by those terms. The list of terms may be expanded based on personalities and/or topics discovered to be associated with a consumer, to include, using Word2Vec, other terms that are also common to sites, including other sites the consumer has not yet visited, having the same personalities and/or topics to enrich an understanding of the consumer. These other sites are pulled in based on the overlapping characteristics of the consumer and the other sites to ensure that similar content is being used to enrich the understanding of the consumer.

In one embodiment, rather than expanding understanding of consumers on a consumer-by-consumer basis, the content manager groups together consumers that have similar characteristics, interests, and/or personalities. In one example, the consumers may be indistinguishable from each other due to common interests but for their unique identities. In another example, the consumers clustered together have similar personalities and similar interests in topics, but those personalities and interests in topics have been determined from different sources of user activity, such as different sites visited, different goods or services purchased, and/or different content engaged with.

The consumer profiles in the identity graph may have connections based on explicitly labeled or "supervised" data that resulted from activity directly tying a consumer to a site, topic, or personality, and other connections based on probabilistic relationships between the consumer and sites, topics, or personalities that have been inferred based on explicitly labeled data. The probabilistic relationships may be represented as edges in the identity graph, with a weight of the edge corresponding to a probability that the site, topic, or personality applies to the consumer.

In one embodiment, certain personalities are unlikely to co-occur with each other. For example, an "adventurous" personality may be negatively correlated with a "cautious" personality. If, in the identity graph, a consumer has been associated with a personality that is unlikely to co-occur with another personality, a weight of an edge between the consumer and the other personality may be decreased due to a weight of an edge between the consumer and the personality being increased. That said, even for rare co-occurrences, co-occurrences may still exist. There may be consumers who are cautious in one aspect of life, content consumption, and/or purchasing decisions, while being adventurous in another aspect of life, content consumption, and/or purchasing decisions. In these scenarios, the occurrence of the personality type may be tied to a particular topic in the identity graph. For example, the consumer node may have a connection with a cautious personality type for topics associated with food, represented by a weighted edge to a "personality: cautious; topic: food" node, and the consumer may have another connection with an adventurous personality type for topics associated with camping, represented by a weighted edge to a "personality: adventurous; topic: camping" node. The identity graph may include any number of combinations of personalities, topics, sentiments, etc., that have been detected to be co-occurring in groups of consumers, and the nodes representing the combinations may have strengths specific to the group and/or specific to individual consumers based on activity detected for the consumers as a whole or individually.

Once a graph has been generated to encode contents of pages, the graph may be used to identify URLs or content sources that attract candidate consumers with certain interests in topics (e.g., from an Interactive Advertising Bureau (IAB) taxonomy or graph), consumer types, sentiments (e.g., from a sentiment taxonomy or graph), brand safety, carbon emissions, disinformation content, and/or personalities. Whether or not secondary content is being placed on a site, a brand owner may wish to investigate the site and the owner of the site to determine topics, consumer types, sentiments, brand safety, carbon emissions, disinformation content, and/or personalities covered by the site. Such an investigation may be useful for exploring a partnership with an owner of the site, for example, and the investigation may be supported in a user interface that provides access to the graph to determine the categories for the sites owned by the owner.

The graph may also be used to combine topics, personalities, consumer types, and other characteristics to find content source(s) that attract candidate consumers, which may be unknown at the individual level, with combinations of interests in topics, consumer types, sentiments, and/or personalities. A content manager accessing the graph may select the content source(s) that have a highest probability of being associated with the combination of characteristics provided, to maximize engagement with an audience that may otherwise be unknown. Secondary content may be delivered on the selected content source(s) to candidate audience members of those selected content source(s) without a need to contact the candidate audience members using personalized or individualized information or any other personally identifiable information (PII).

Personality-Targeted Content Delivery

Once newly identified primary content has been categorized, for example, as a result of a first request for secondary content to be included with the primary content, the categorized primary content may be used for placing targeted secondary content in future iterations of content delivery. Additional requests may be received for content to be included in new user sessions with a content distribution service such as a web site. A classifier may determine that the site is included in the set of labeled sites in association with one or more contextual personality labels. This determination may be made based on the site information stored as part of the set of labeled sites and does not require information, such as PII, about users of the new user sessions. In other words, the mere fact that the users are visiting the site is sufficient to conclude an interest in the topic, personality, and other categories associated with the site. A content manager may retrieve secondary content associated with the categories of the primary content for inclusion in the new user sessions.

In one embodiment, a topic, personality, and sentiment combination may be used to enhance content affinity for content selected to be delivered to the candidate consumer. In various embodiments, content may be chosen based on a secondary content provider's election to place the content in front of consumers with certain characteristics. For example, the secondary content provider may agree, via a content management platform, to compensate an owner of a site of primary content if the site of primary content is modified to include secondary content from the secondary content provider, such as a banner or graphic. The content management platform may detect that the primary content of the site fits a personality, topic, characteristic, or other category or combination of categories specified by the secondary content provider, and, based on determining that the primary content fits the category specified by the secondary content provider, place the secondary content on the site along with the primary content for consumption by the consumer.

A classifier may categorize the primary content by looking up the site in a set of sites for which content has already been categorized. If the site is not in the set, the classifier may parse the content of the site to categorize the site by matching a vector of the site's contents to vectors of existing categories of, for example, personality categories. In one embodiment, a content manager selects random or pseudo-random secondary content for inclusion on the site when the primary content has not yet been parsed or is otherwise unknown. The selected secondary content in this scenario may include secondary content that has been placed for inclusion on any site of primary content, in a manner not specific to any category. Such broad content placement may cost less than targeted content placement. While the secondary content is placed, the site may be parsed to generate a vector embedding of the site's contents and match the vector embedding to vector embeddings for existing categories. The next time the site is requested, the categories may already be stored in a cache such that the categories may be readily determined and secondary content may be chosen that has been specifically placed for categories of the site's primary content. Such secondary content placement may cost more due to the increased effectiveness of the targeting specific to categories.

In one embodiment, a content distribution service makes a first call to a classifier to request a category and a second call to a content manager to provide content for the resulting category. In this embodiment, the content distribution service may be configured to select and include secondary content items based on the received category, which may identify contextual personality labels. In other words, providing the resulting category to the content distribution service may cause the content distribution service to seek and retrieve secondary content from the content manager associated with the received category and add the retrieved secondary content to primary content in an active user session.

In another embodiment, a content distribution service makes a first call to a classifier, and the classifier forwards a resulting category to a content manager to provide content to the content distribution service for the resulting category. In this embodiment, the classifier may be configured to provide the resulting category to the content manager, and the content manager may be configured to retrieve secondary content associated with the resulting category in response to receiving the resulting category. In turn, the content distribution service may be configured to place the secondary content from the content manager into content being delivered in an active user session. In other words, providing the resulting category to the content manager causes secondary content associated with the category to be added to primary content in an active user session.

Referring back to FIG. 1, once a site is included in a set of labeled content distribution services such as sites, process 100 continues to block 112, where a contextual personality label is retrieved for the site from the set of labeled sites. The contextual personality label is used by the content manager in block 114 to retrieve secondary content associated with the contextual personality label. Then, in block 116, the secondary content is sent for inclusion in the active user session with the site. Process 100 continues to block 118, where engagement by the candidate consumer with the secondary content is tracked so information may be updated on a graph of candidate consumers, sites of primary content, and/or items of secondary content to reflect a success (engagement or conversion) or failure (lack of engagement) for the candidate consumer, site, or item of secondary content.

In one example, the content manager may include an auction interface for bidding on placement of secondary content for sites with certain categories over certain time periods. Bids for placement of secondary content may be higher for certain categories than for others, and may be higher than for uncategorized sites which may have received their own bids via the auction interface. The content manager may select a currently highest bidder in real-time as a site of primary content is loaded when placing secondary content on the site of primary content. Alternatively, the highest bidder may be determined periodically for different time windows and combinations of categories.

If the site is in the set of sites for which content has already been categorized, the classifier identifies the category as cached or indexed for the site in the set so the secondary content corresponding to the highest bidder for the category may be retrieved and placed on the site of primary content in real-time (e.g., milliseconds or less than a second). The cache may store information about topics, consumer types, sentiments, brand safety, carbon emissions, disinformation content, and/or personalities previously determined for the site, to allow secondary content providers to bid on combinations of categories. The cache may include an application programming interface (API) where the categories of a site are provided in response to a request that identifies the site. In one embodiment, compressed caches that include frequently used subsets of the sites and exclude infrequently used subsets of the sites are stored at different regional servers in different locations, to improve an efficiency and speed by which the regional servers can identify the topics, consumer types, sentiments, brand safety, carbon emissions, disinformation content, and/or personalities for the site, to improve the efficiency and speed by which the regional servers can select secondary content for inclusion on the site of primary content. In one embodiment, the regional servers keep an item in cache for a period of time (e.g., 7 days) after the item has last been requested to promote inclusion of recent and frequently used items in the cache.

An owner of the site of primary content may be compensated pursuant to an agreement with the content management platform for any secondary content placed on the site of primary content. The amount of the compensation may be tracked based on how many times secondary content is placed on the site, for how many consumers, and the amount may first be deducted or extracted from a provider of the secondary content pursuant to an agreement with the content management platform. In one embodiment, the provider of secondary content is assigned digital currency in exchange for payment. The digital currency may be assigned to the owner of the site of primary content via a blockchain that manages ownership of the digital currency. The owner of the site of primary content may then exchange the digital currency for payment and/or may use the digital currency to place secondary content on other sites of primary content owned by other parties.

Figure 4:
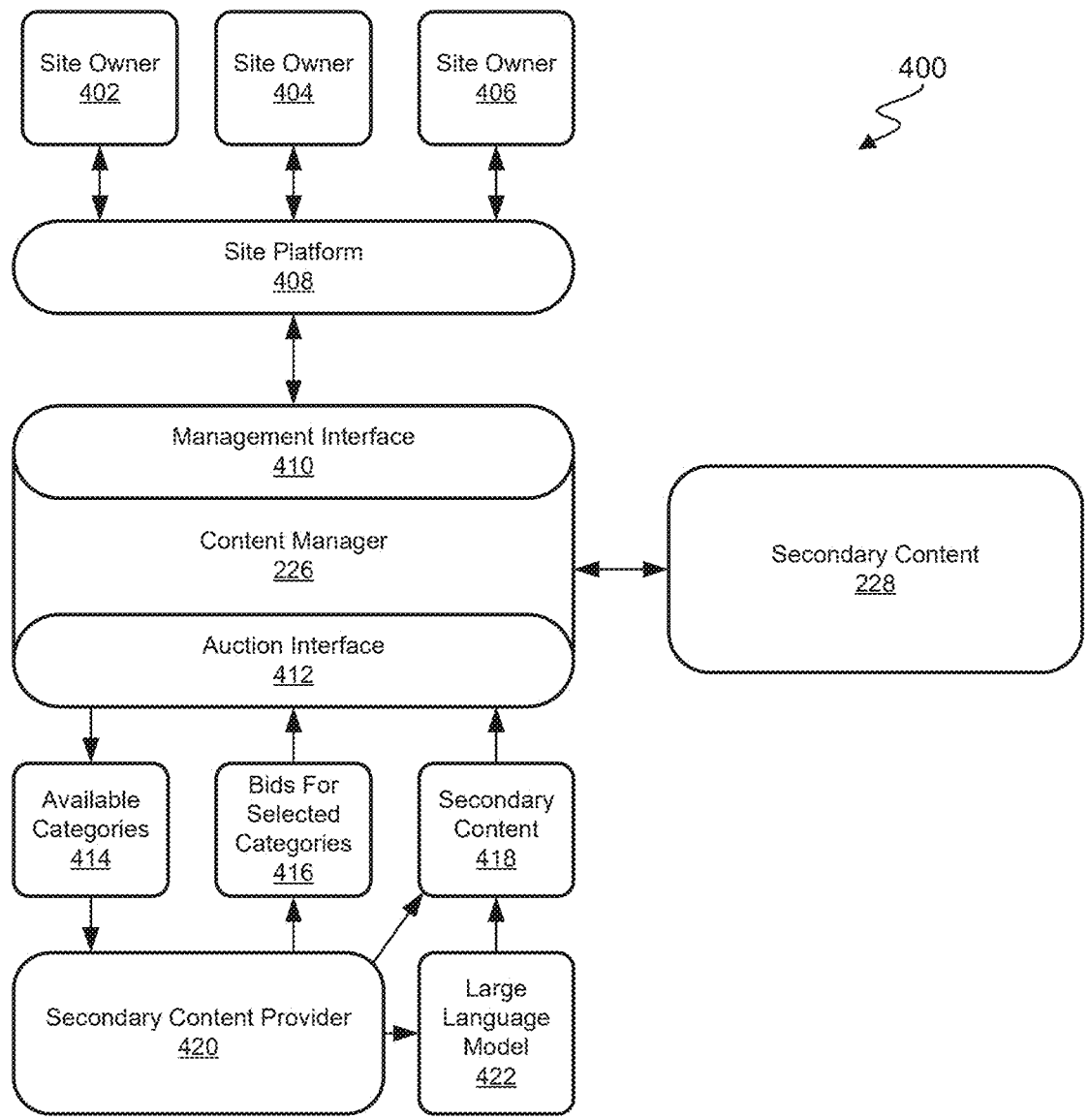
FIG. 4 illustrates a diagram of an example system for providing secondary content for inclusion with primary content in selected categories.

FIG. 4 illustrates a diagram of an example system 400 for providing secondary content for inclusion with primary content in selected categories. As shown, site owners 402, 404, and 406 use site platform 408 to host sites. Site platform 408 may have an agreement with content manager 226, configured via management interface 410, to place secondary content on sites in exchange for compensation, which may or may not be passed along, in full or in part, to site owners 402, 404, or 406. Content manager 226 places secondary content 228 on web sites of site owners 402, 404, and 406 based on script call-outs to content manager 226 from the web sites. The secondary content 228 selected may be determined based on bids for selected categories 416 provided via auction interface 412 by secondary content provider 420. Auction interface 412 may provide to secondary content provider 420 a set of available categories 414 for which secondary content may be placed. Secondary content provider 420 may place bids for selected categories 416 as those categories are determined to be uniquely or particularly useful for consumer outreach efforts by secondary content provider 420. Secondary content provider 420 also provides secondary content 418, which may be manually curated for certain categories 416 and/or automatically generated by large language model 422 based on prompts that are specific to certain categories 416. The secondary content 418 provided is stored as part of secondary content 228 from a variety of secondary content providers for selection and inclusion in a variety of web sites from a variety of site owners.

Once content has been successfully delivered to, interacted with or engaged with, or used to trigger a purchase or conversion, or otherwise positively consumed by consumers, lookalike content or content with similar characteristics may be selected for delivering additional content to the consumers or to other consumers who are clustered with the consumers.

In a particular example, a provider of secondary content may bid on a sports shoes topic and an adventurous personality type via an auction interface that allows the provider to bid on any selected combinations of categories. As a site loads, if the site is related to sports shoes but not to the adventurous personality type, the provider's bid may not be counted for the site. If the site is related to both of the selected categories, sports shoes and adventurous personality type, the provider's bid, which may be higher than bids for either category in isolation, may be counted for the site. As a result, the provider's secondary content may be retrieved and placed on the site of primary content for consumption by a consumer of the site of primary content and now secondary content. In this particular example, the provider's secondary content may be optimized for viewing by consumers in the specified categories. For example, for adventurous consumers interested in sports shoes, the secondary content may show the provider's brand of sports shoes being used to climb a mountain.

Figure 5:
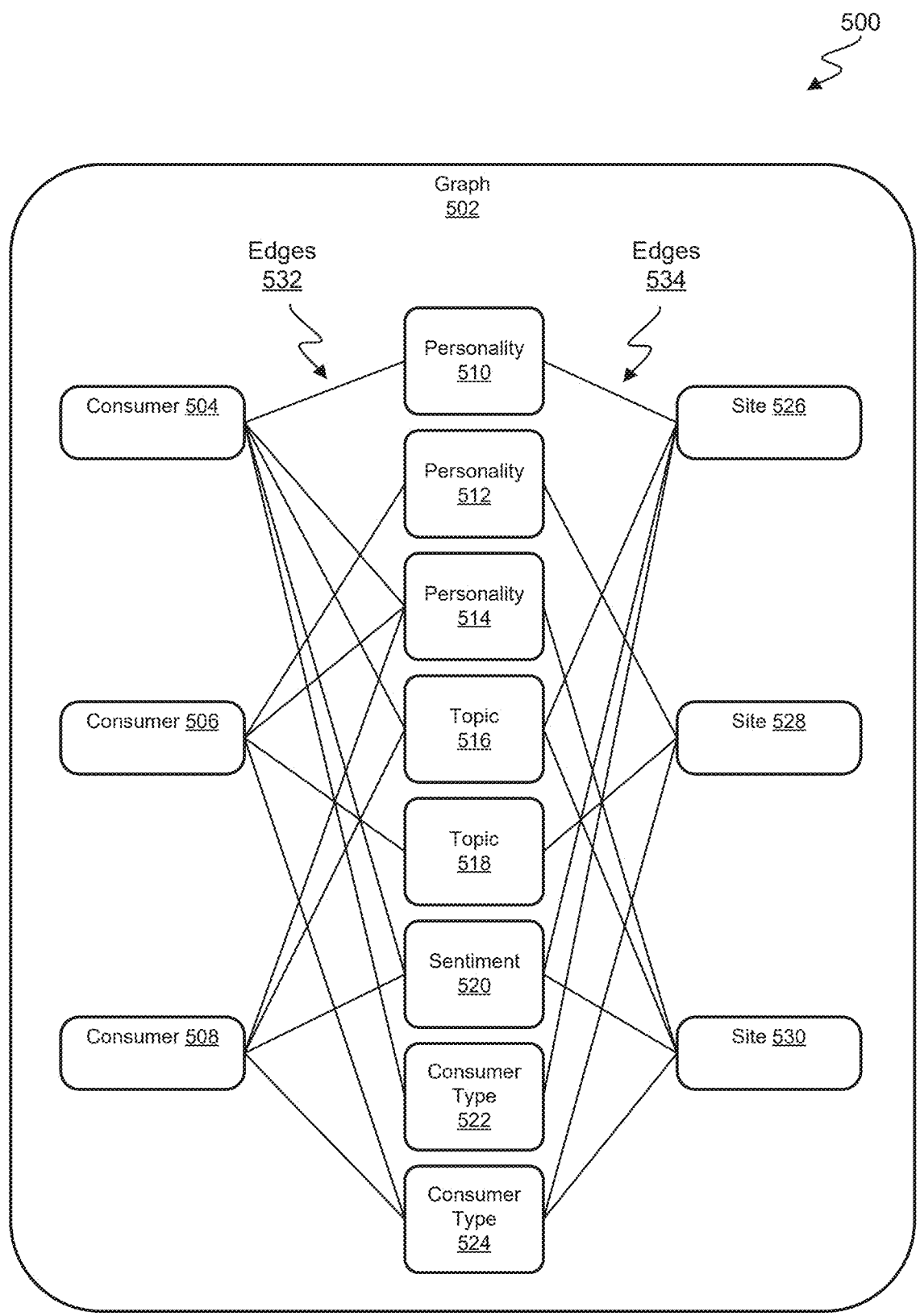
FIG. 5 illustrates a visualization of an example data structure for storing consumer and site categories and weights.

FIG. 5 illustrates a visualization 500 of an example data structure, graph 502, for storing consumer and site categories and weights. As shown, consumers 504, 506, and 508 are represented in graph 502, as well as sites 526, 528, and 530. In some other embodiments, consumers and sites may be represented on separate graphs as well as other characteristics that may be graphed separately. In yet other embodiments, graph 502 may include further nodes representing secondary content items and their associations with other nodes on the graph 502. As shown, graph 502 stores a relationship between consumer 504 and personality 510, personality 514, topic 516, sentiment 520, and consumer type 522 with various weights (not shown) that are stored in edges 532. Similarly, graph 502 stores a relationship between consumer 506 and personality 512, personality 514, topic 518, and consumer type 524 with various weights (not shown) that are stored in edges 532. Graph 502 also stores a relationship between consumer 508 and personality 514, topic 516, sentiment 520, and consumer type 524 with various weights (not shown) that are stored in edges 532.

Graph 502 also stores a relationship between site 526 and personality 510, topic 516, sentiment 520, consumer type 522, and consumer type 524 with various weights (not shown) that are stored in edges 534. Additionally, graph 502 stores a relationship between site 528 and personality 512, topic 518, and consumer type 524 with various weights (not shown) that are stored in edges 534. Finally, in the example, graph 502 stores a relationship between site 530 and personality 514, topic 516, sentiment 520, and consumer type 524 with various weights (not shown) that are stored in edges 534. In other more complex examples, the number of nodes and edges in graph 502 may number in the millions or billions to represent the variety of different candidate consumers, the variety of different sites, and/or the variety of secondary content items.

Update Audience Based on Content Delivery Context

In various embodiments, information about what content has been successfully delivered to, interacted with or engaged with, or used to trigger a purchase or conversion, or otherwise positively consumed by consumers is used to infer personality characteristics for individual consumers that positively consumed the content. The personality characteristics for the content in the graph may be used to add personality characteristics to the consumer in the graph, strengthening the tie between the consumer and the personality due to the positive interaction. The additional observations are due to the consumer's interaction with particular sites in particular categories. If there is no specific consumer identity known, characteristics of an anonymous consumer may be enriched. If the identity of the consumer is learned from the interactions with the sites, categories for the sites may be tied to the individual consumer in the graph.

The content manager may use the identity graph to find lookalike consumers for content delivery targeting, where the lookalike consumers have similar characteristics to consumers who have recently consumed content (even if the lookalike consumers have not recently consumed content), and/or to find other consumers who in a same cluster of consumers as the consumers who have recently consumed content or are likely to consume content for gaining a deeper understanding of characteristics that may be shared by the recent consumers.

Based on the adjustments to individuals of a group, other candidate consumers of the group may also be adjusted based on their membership to the group. In other words, if a group shifts in personality based on observed shifts from individual users in the group, other individual users of the group may also be adjusted to shift in personality to a lesser degree.

In one embodiment, a group, cluster, or candidate audience of candidate consumers may be grouped or clustered based on shared or similar characteristics. A group of candidate consumers that is grouped based on a set of characteristics other than personality may be determined to also comprise consumers that have the personality. If the personality is detected more than other personalities in content consumed by the group of consumers, the group may be labeled with the personality as well as the other shared or similar characteristics. In this manner, the group may be used for content delivery targeting based on the personality.

In another embodiment, candidate consumers that were not previously grouped are detected as showing an interest in consuming content associated with a personality, and, as a result, the candidate consumers are grouped together in a group to be used for content delivery targeting based on the personality.

In one embodiment, candidate consumers who have been included in a group of candidate consumers having a personality may be removed from the group if the candidate consumers do not exhibit behavior similar to other candidate consumers in the group. For example, if the group includes candidate consumers who frequently visit pages marked with a personality, and a particular candidate consumer does not frequently visit pages marked with the personality and/or instead visits pages marked with other personalit(ies), the particular candidate consumer may be removed from the group as unlikely to exhibit the personality or behave consistently with the personality.

In various embodiments, the addition to or removal of candidate consumers from a group causes the candidate consumers to be included in or excluded from content delivery campaigns. The content delivery campaign may be defined based on contextual personality labels, and membership of candidate consumers to a group associated with the contextual personality labels may change over time based on updates to the groups. The campaigns may cause delivery to candidate consumers who are currently part of the group without causing delivery to candidate consumers who have been removed from the group.

In one embodiment, audiences updated with personality information based on the content delivery context may be used to adjust content outreach strategies, adjust content generated, and/or adjust products or services offered. A user interface may display, to a user, information that a brand is associated with an audience of candidate consumers or actual past consumers that have newly been associated with a personality context. The personality context may be provided to update strategies to ensure the consumers expectations are met with content delivered.

Update Content Delivery Context Based on Audience

In one embodiment, candidate consumers are associated with activities or engagement that is known to be associated with a certain personality type. For example, candidate consumers making purchases to take trips to exotic or dangerous locations may be known to be adventurous by their evidenced activity. As another example, candidate consumers who have characteristics in common (e.g., having active frequent flyer accounts, owning certain vehicles, etc.) with other adventurous people may be clustered with adventurous people based on the common characteristics. In yet another embodiment, candidate consumers may have responded to content delivery campaigns where the candidate consumers were directly contacted, and such responses may indicate an interest in certain topics covered by the campaigns. In this manner, a size of a group of candidate consumers marked as having a certain personality may grow independently of pages visited or content consumed by the candidate consumers.

In one embodiment, the changing group of candidate consumers known to be associated with a personality may be used to update which content sources are associated with the personality. For example, if the changing group frequently visits a page that is not on a list of content sources associated with the personality, the page may be added to the list. As another example, if the changing group infrequently or never visits a page that is on the list, for example, even after being given opportunities to visit the page, the page may be removed from the list.

A graph that associates sites to personalities, topics, and other categories may be updated based on a graph that associates candidate consumers to personalities, topics, and other categories. For example, if a set of candidate consumers show a strong tendency or high likelihood of consuming content in a particular personality, topic, or other category, or a combination thereof, and the set of candidate consumers also show a strong tendency or high likelihood of consuming content from a specific site, the specific site may be labeled with the particular personality, topic, or other category. Alternatively, a strength of a tie or weight between the specific site and the particular personality, topic, or other category may be increased based on the candidate consumer association.

The candidate consumer information may be used to generate or update the information about primary content, or vice versa. The candidate consumer information from the graph may exist first, and groups of consumers known to have certain personalities may be analyzed to determine top sites visited by the groups of consumers. Those sites may be used as seeds to generate keywords and categories for primary content. Alternatively, the site mappings may exist first based on seeds that are used to generate keywords, and the sites known to appeal to certain personalities may be analyzed to determine which consumers are visiting the sites. Inferences may be made that those consumers are interested in the topics, personalities, or other categories covered by the sites to build or update the consumer graph.

Figure 3:
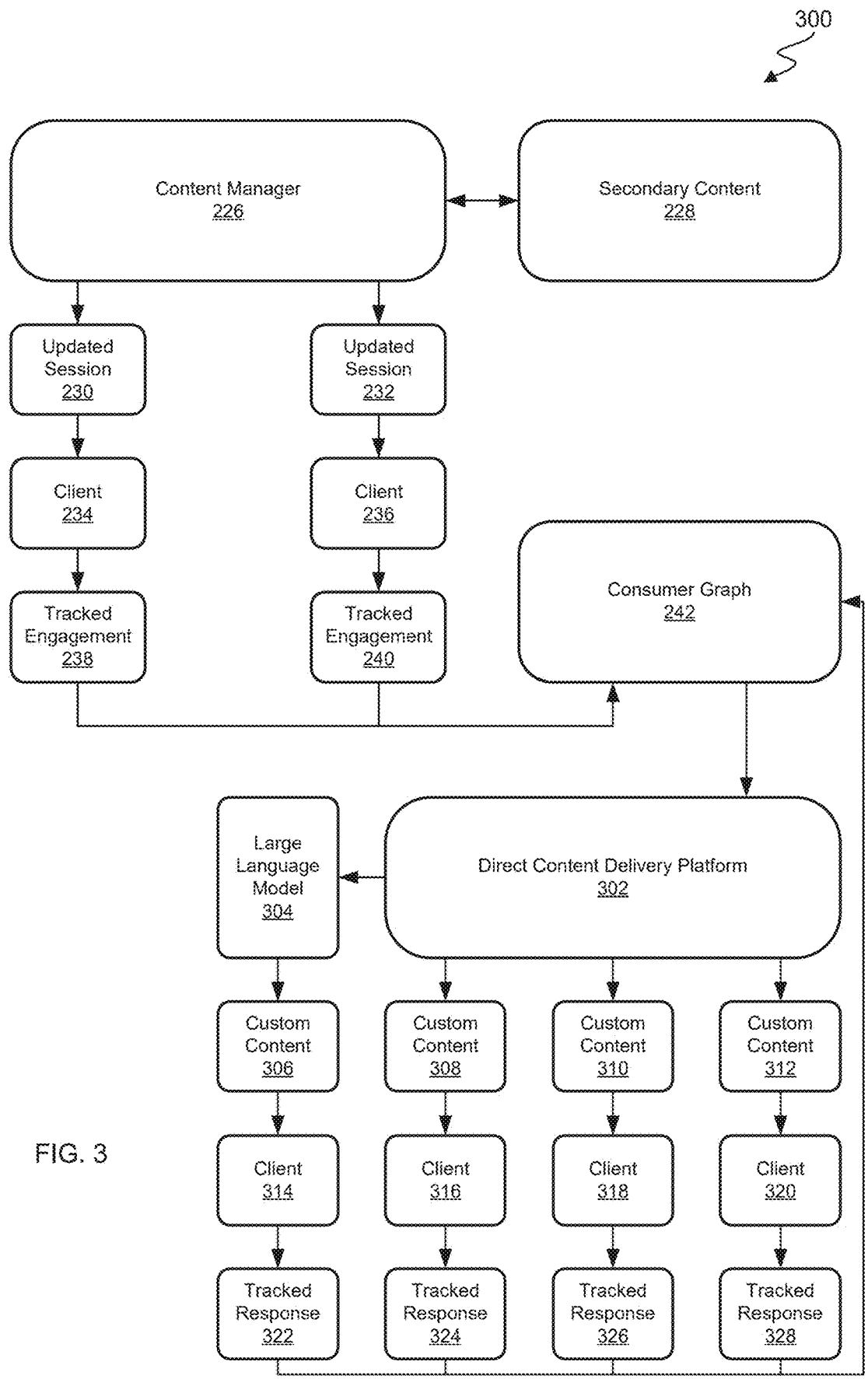
FIG. 3 illustrates a diagram of an example system for updating and using a consumer graph based on tracked engagement with secondary content.

FIG. 3 illustrates a diagram of an example system 300 for updating and using a consumer graph based on tracked engagement with secondary content. As described with respect to FIGS. 1 and 2, consumer graph 242 may be updated based on tracked engagement 238 and 240 that results from consumer interaction with secondary content 228 or primary content with which the secondary content was placed. The updated consumer graph 242 may be used by direct content delivery platform 302 to deliver custom content 306, 308, 310, and 312 to clients 314, 316, 318, and 320 using direct contact information such as email addresses, physical addresses, phone numbers for text messaging, and/or phone numbers for calling. In one embodiment, large language model 304 is used to generate custom content 306 that accounts for personalities, topics, or other categories of information known to be of interest to an audience including client 314. In other embodiments, custom content 308, 310, and 312 is selected by direct content delivery platform 302 based on personalities, topics, or other categories of information known to be of interest to an audience including clients 316, 318, or 320. Once custom content 306, 308, 310, and 312 has been delivered to clients 314, 316, 318, and 320, engagement or responses with the custom content may be tracked in tracked responses 322, 324, 326, and 328. Tracked responses 322, 324, 326, and 328 are provided to updated consumer graph 242 to reflect expected probabilities and/or extents of engagement, higher than expected probabilities and/or extents of engagement, or lower than expected probabilities and/or extents of engagement. Updated expected probabilities and/or expected extents of engagement for content based on the personalities, topics, or other categories may be stored in a graph in association with the audience, which is associated with the candidate consumers included in the audience. Individual responses 322, 324, 326, and 328 may also be stored in association with individual consumers represented in the graph 242 to determine individual strengths of association with personalities, topics, or other categories. Such information may be used to determine what content to include in future content provided to clients 314, 316, 318, 320, or other clients.

TRACKED ENGAGEMENT OF PERSONALITY-TARGETED CONTENT

In various embodiments, content delivered to a candidate consumer is tracked, whether the content is delivered in as part of primary content on a web site or as content included in a personalized message to the candidate consumer. Tracking may occur by marking the secondary content to be consumed with a marker that may be specific to the site or campaign used to place the secondary content, or may be specific even to the individual candidate consumer, possibly without knowledge of any personally identifiable information about the individual candidate consumer.

If the content manager delivers content specific to an individual candidate consumer, the content may be tracked with respect to an anonymous candidate consumer. The anonymity of the candidate consumer may remain intact, in which case any other information learned such as the site visited, engagement that occurred, etc., will remain anonymous in the sense that no individual consumer has been identified with PII. That said, the information learned is still specific to the instance of content delivery that occurred. For example, the content manager may deliver the same item of secondary content on a site twice, but the item of secondary content may be marked with a first marker with a first identifier in a first instance and a second marker with a second identifier in a second instance. Any activity that occurs, such as viewing or clicking the secondary content, may pass the corresponding identifier back to the content manager to determine which instance of content delivery is being updated.

Downstream consumer activity may eventually cause an email address, address, IP address, or other information to be provided such that the previously anonymous instance of content delivery is now non-anonymous. Any information learned in the series of actions leading up to the downstream consumer activity may be included in the profile of the candidate consumer.

In one embodiment, tracking pixels or other embedded tracking identifiers are used to track viewing, clicking, or other engagement with content items. The secondary content may include a script that, when loaded, makes a call to a server such as the content manager to inform the server that the secondary content has been loaded. Selecting the secondary content may trigger another script that informs the server that the secondary content has been clicked. A particular user profile for the candidate consumer may be updated, for example, in a candidate consumer graph, to indicate any engagement that occurred and to improve targeting for the candidate consumer going forward based on the tracked engagement.

Updating Personality Labels for Secondary Content

In addition to updating a graph to indicate the effectiveness of primary content as a vehicle for the delivery of secondary content based on certain topics, personalities, and/or other categories, the content manager may update metadata stored in association with the secondary content to indicate an increased or decreased effectiveness of the secondary content for certain topics, personalities, and/or other categories. For example, if secondary content receives high engagement for certain personalities and low engagement for other personalities, the content manager may increase the score of the secondary content for the certain personalities and decrease the score of the secondary content for the other personalities.

The scores for the secondary content may be maintained to optimize automatic selection of secondary content that is most relevant to a topic, personality, and/or other category of primary content on which the secondary content is to be placed. In another example, the scores may be maintained to optimize which content is selected for delivery to candidate consumers in a direct communication campaign, when the candidate consumers being contacted have been categorized as having a topic, personality, and/or other category in common. The secondary content most relevant to the category known to be relevant for the mode of communication may be selected for delivery.

The scores for secondary content may be maintained as weights of graphed edges between nodes representing the secondary content and nodes representing the personalities, topics, or other categories. As user engagement occurs or does not occur as a result of attempts at user engagement, weights of the graphed edges may be updated. Edge weights may decrease as attempts at engagement using the secondary content increase, and increase as engagement occurs as a result of the attempts. In one embodiment, the graph edge weights indicate a probability of engagement for a candidate consumer interested in a certain category based on historical data.

Generating Content to Match Personality Labels

In various embodiments, content may be generated based on one or more personality labels for candidate consumers that are part of a candidate audience. If the content generator is aware of the personality of the content consumer, the content generator may generate content that is more tailored to and optimized for content consumers with that personality, to maximize engagement. In one embodiment, the content generator may be a user viewing a user interface that provides analytics about the candidate audience, and the user may tailor the content based on the personality information provided on the user interface. In another embodiment, the content generator is a machine that selects existing content, assembles a combination of existing content, assembles a combination of existing and new content, and/or generates new content based on the personality information.

In one embodiment, a prompt is generated for a large language model based on personality information for a candidate audience. The prompt may request textual, image, and/or video content that will cause positive engagement with a user having a particular personality, and/or incorporating certain images, such as brand images or images of goods or services, in the result. Large language models such those from Cohere and/or OpenAI may be used to generate results for the prompt, and a user may review the results before sending to the candidate audience. In one embodiment, the results from the large language model are incorporated into a content delivery campaign for the candidate audience and sent to the audience automatically without user intervention between detecting the personality of the candidate audience and delivering content to the candidate audience.

In one embodiment, the prompt to the large language model or a guide on the user interface for a content drafting user may include keywords known to be associated with the target personality, such as keywords from the Word2Vec model of the personality categories. The keywords may be included as suggested terms or concepts to included in targeted content, and the targeted content may be prompted to offer or sell certain goods or services or include a tag line to interest candidate consumers in engaging with content to offer or sell certain goods or services.

In one embodiment, as a result of the prompt, the large language model automatically generates a text template to be included in a corpus of content for delivery in association with a topic, personality, or other category. The text template may be customized and personalized for individual candidate consumers, for example, by replacing name placeholders with actual names of the candidate consumers as determined from a candidate consumer profile in a candidate consumer graph. The text template may also be customized and personalized further based on individual interests or preferences of the candidate consumer, which may also be determined from the consumer profile in the candidate consumer graph. The customized text may be included as part of content delivered to the candidate consumer, for example, in a direct communication campaign.

Computer System Architecture

Figure 6:
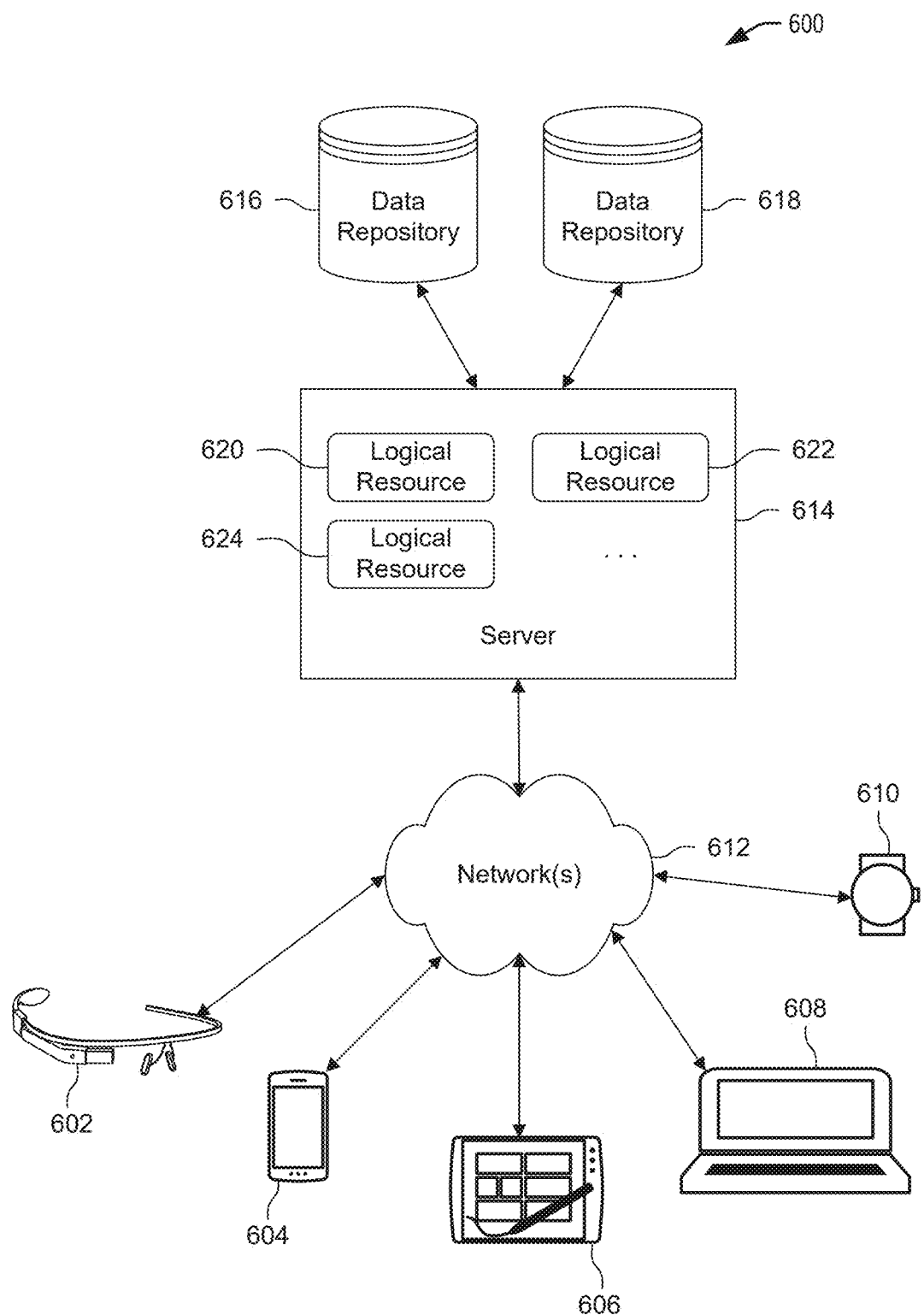
FIG. 6 depicts a simplified diagram of an example distributed system for implementing certain aspects.

FIG. 6 depicts a simplified diagram of a distributed system 600 for implementing an embodiment. In the illustrated embodiment, distributed system 600 includes one or more client computing devices 602, 604, 606, 608, and/or 610 coupled to a server 614 via one or more communication networks 612. Clients computing devices 602, 604, 606, 608, and/or 610 may be configured to execute one or more applications.

In various aspects, server 614 may be adapted to run one or more services or software applications that enable techniques for selecting secondary content for inclusion with the primary content based on a contextual personality of the primary content.

In certain aspects, server 614 may also provide other services or software applications that can include non-virtual and virtual environments. In some aspects, these services may be offered as web-based or cloud services, such as under a Software as a Service (SaaS) model to the users of client computing devices 602, 604, 606, 608, and/or 610. Users operating client computing devices 602, 604, 606, 608, and/or 610 may in turn utilize one or more client applications to interact with server 614 to utilize the services provided by these components.

In the configuration depicted in FIG. 6, server 614 may include one or more components 620, 622 and 624 that implement the functions performed by server 614. These components may include software components that may be executed by one or more processors, hardware components, or combinations thereof. It should be appreciated that various different system configurations are possible, which may be different from distributed system 600. The embodiment shown in FIG. 6 is thus one example of a distributed system for implementing an embodiment system and is not intended to be limiting.

Users may use client computing devices 602, 604, 606, 608, and/or 610 for techniques for selecting secondary content for inclusion with the primary content based on a contextual personality of the primary content in accordance with the teachings of this disclosure. A client device may provide an interface that enables a user of the client device to interact with the client device. The client device may also output information to the user via this interface. Although FIG. 6 depicts only five client computing devices, any number of client computing devices may be supported.

The client devices may include various types of computing systems such as smart phones or other portable handheld devices, general purpose computers such as personal computers and laptops, workstation computers, smart watches, smart glasses, or other wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, Apple Watch®, Meta Quest®, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 612 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 612 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 614 may be composed of one or more general purpose computers, specialized server computers (including, by way of example, PC (personal computer) servers, UNIX® servers, mid-range servers, mainframe computers, rack-mounted servers, etc.), server farms, server clusters, a Real Application Cluster (RAC), database servers, or any other appropriate arrangement and/or combination. Server 614 can include one or more virtual machines running virtual operating systems, or other computing architectures involving virtualization such as one or more flexible pools of logical storage devices that can be virtualized to maintain virtual storage devices for the server. In various aspects, server 614 may be adapted to run one or more services or software applications that provide the functionality described in the foregoing disclosure.

The computing systems in server 614 may run one or more operating systems including any of those discussed above, as well as any commercially available server operating system. Server 614 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, SAP®, Amazon®, Sybase®, IBM® (International Business Machines), and the like.

In some implementations, server 614 may include one or more applications to analyze and consolidate data feeds and/or event updates received from users of client computing devices 602, 604, 606, 608, and/or 610. As an example, data feeds and/or event updates may include, but are not limited to, blog feeds, Threads® feeds, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 614 may also include one or more applications to display the data feeds and/or real-time events via one or more display devices of client computing devices 602, 604, 606, 608, and/or 610.

Distributed system 600 may also include one or more data repositories 616, 618. These data repositories may be used to store data and other information in certain aspects. For example, one or more of the data repositories 616, 618 may be used to store information for techniques for selecting secondary content for inclusion with the primary content based on a contextual personality of the primary content. Data repositories 616, 618 may reside in a variety of locations. For example, a data repository used by server 614 may be local to server 614 or may be remote from server 614 and in communication with server 614 via a network-based or dedicated connection. Data repositories 616, 618 may be of different types. In certain aspects, a data repository used by server 614 may be a database, for example, a relational database, a container database, an Exadata storage device, or other data storage and retrieval tool such as databases provided by Oracle Corporation® and other vendors. One or more of these databases may be adapted to enable storage, update, and retrieval of data to and from the database in response to structured query language (SQL)-formatted commands.

In certain aspects, one or more of data repositories 616, 618 may also be used by applications to store application data. The data repositories used by applications may be of different types such as, for example, a key-value store repository, an object store repository, or a general storage repository supported by a file system.

In one embodiment, server 614 is part of a cloud-based system environment in which various services may be offered as cloud services, for a single tenant or for multiple tenants where data, requests, and other information specific to the tenant are kept private from each tenant. In the cloud-based system environment, multiple servers may communicate with each other to perform the work requested by client devices from the same or multiple tenants. The servers communicate on a cloud-side network that is not accessible to the client devices in order to perform the requested services and keep tenant data confidential from other tenants.

Figure 7:
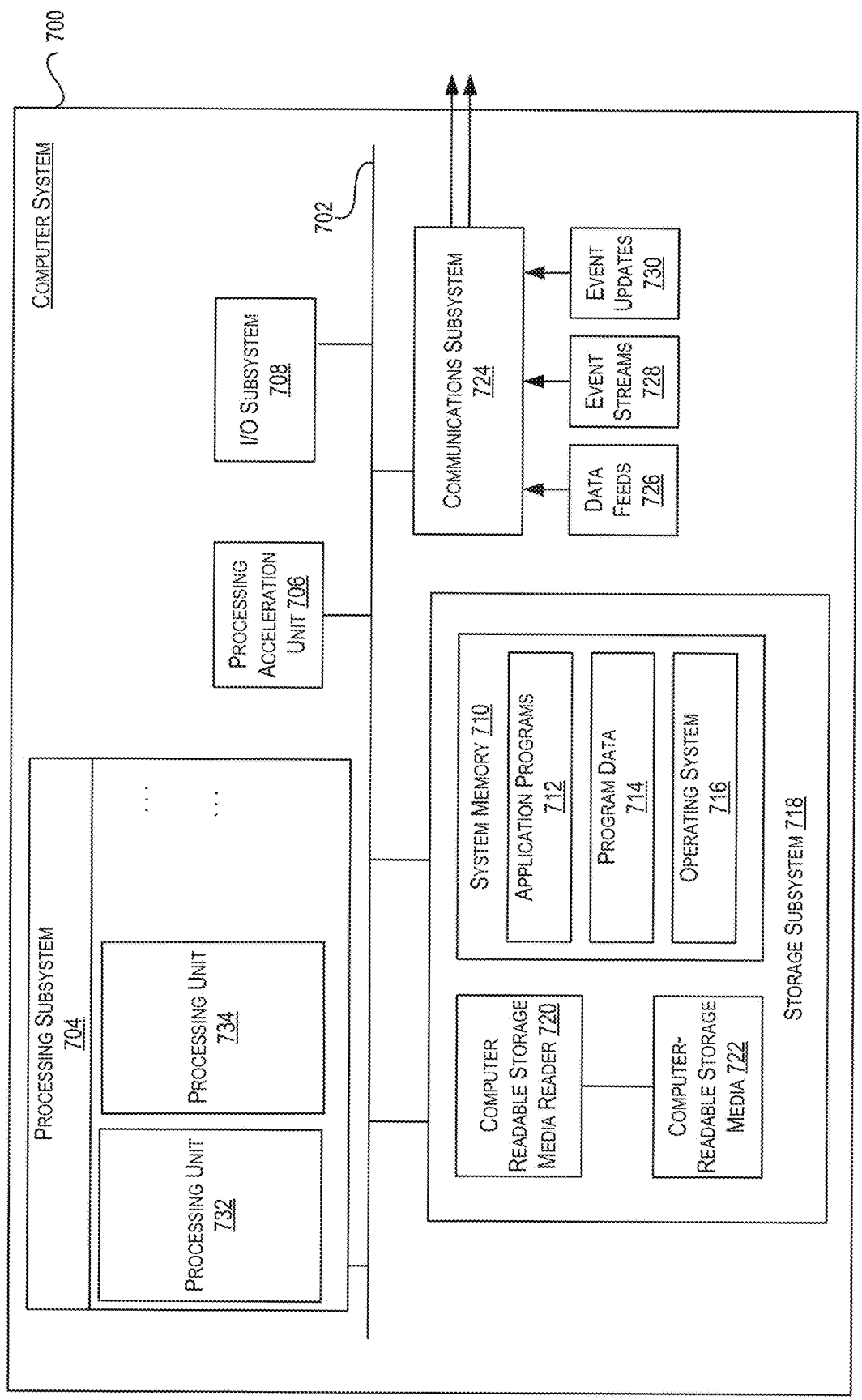
FIG. 7 illustrates an example computer system that may be used to implement certain aspects.

FIG. 7 illustrates an exemplary computer system 700 that may be used to implement certain aspects. As shown in FIG. 7, computer system 700 includes various subsystems including a processing subsystem 704 that communicates with a number of other subsystems via a bus subsystem 702. These other subsystems may include a processing acceleration unit 706, an I/O subsystem 708, a storage subsystem 718, and a communications subsystem 724. Storage subsystem 718 may include non-transitory computer-readable storage media including storage media 722 and a system memory 710.

Bus subsystem 702 provides a mechanism for letting the various components and subsystems of computer system 700 communicate with each other as intended. Although bus subsystem 702 is shown schematically as a single bus, alternative aspects of the bus subsystem may utilize multiple buses. Bus subsystem 702 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 704 controls the operation of computer system 700 and may comprise one or more processors, application specific integrated circuits (ASICs), or field programmable gate arrays (FPGAs). The processors may include be single core or multicore processors. The processing resources of computer system 700 can be organized into one or more processing units 732, 734, etc. A processing unit may include one or more processors, one or more cores from the same or different processors, a combination of cores and processors, or other combinations of cores and processors. In some aspects, processing subsystem 704 can include one or more special purpose co-processors such as graphics processors, digital signal processors (DSPs), or the like. In some aspects, some or all of the processing units of processing subsystem 704 can be implemented using customized circuits, such as application specific integrated circuits (ASICs), or field programmable gate arrays (FPGAs).

In some aspects, the processing units in processing subsystem 704 can execute instructions stored in system memory 710 or on computer readable storage media 722. In various aspects, the processing units can execute a variety of programs or code instructions and can maintain multiple concurrently executing programs or processes. At any given time, some or all of the program code to be executed can be resident in system memory 710 and/or on computer-readable storage media 722 including potentially on one or more storage devices. Through suitable programming, processing subsystem 704 can provide various functionalities described above. In instances where computer system 700 is executing one or more virtual machines, one or more processing units may be allocated to each virtual machine.

In certain aspects, a processing acceleration unit 706 may optionally be provided for performing customized processing or for off-loading some of the processing performed by processing subsystem 704 so as to accelerate the overall processing performed by computer system 700.

I/O subsystem 708 may include devices and mechanisms for inputting information to computer system 700 and/or for outputting information from or via computer system 700. In general, use of the term input device is intended to include all possible types of devices and mechanisms for inputting information to computer system 700. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, QR code readers, barcode readers, 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments, and the like.

In general, use of the term output device is intended to include all possible types of devices and mechanisms for outputting information from computer system 700 to a user or other computer. User interface output devices may include a display subsystem, indicator lights, or non-visual displays such as audio output devices, etc. The display subsystem may be a cathode ray tube (CRT), a flat-panel device, such as that using a light emitting diode (LED) display, a liquid crystal display (LCD) or plasma display, a projection device, a touch screen, a computer monitor and the like. For example, user interface output devices may include, without limitation, a variety of display devices that visually convey text, graphics, and audio/video information such as monitors, printers, speakers, headphones, automotive navigation systems, plotters, voice output devices, and modems.

Storage subsystem 718 provides a repository or data store for storing information and data that is used by computer system 700. Storage subsystem 718 provides a tangible non-transitory computer-readable storage medium for storing the basic programming and data constructs that provide the functionality of some aspects. Storage subsystem 718 may store software (e.g., programs, code modules, instructions) that when executed by processing subsystem 704 provides the functionality described above. The software may be executed by one or more processing units of processing subsystem 704. Storage subsystem 718 may also provide a repository for storing data used in accordance with the teachings of this disclosure.

Storage subsystem 718 may include one or more non-transitory memory devices, including volatile and non-volatile memory devices. As shown in FIG. 7, storage subsystem 718 includes a system memory 710 and a computer-readable storage media 722. System memory 710 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 700, such as during start-up, may typically be stored in the ROM. The RAM typically contains data and/or program modules that are presently being operated and executed by processing subsystem 704. In some implementations, system memory 710 may include multiple different types of memory, such as static random access memory (SRAM), dynamic random access memory (DRAM), and the like.

By way of example, and not limitation, as depicted in FIG. 7, system memory 710 may load application programs 712 that are being executed, which may include various applications such as Web browsers, mid-tier applications, relational database management systems (RDBMS), etc., program data 714, and an operating system 716. By way of example, operating system 716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 722 may store programming and data constructs that provide the functionality of some aspects. Computer-readable media 722 may provide storage of computer-readable instructions, data structures, program modules, and other data for computer system 700. Software (programs, code modules, instructions) that, when executed by processing subsystem 704 provides the functionality described above, may be stored in storage subsystem 718. By way of example, computer-readable storage media 722 may include non-volatile memory such as a hard disk drive, a magnetic disk drive, an optical disk drive such as a CD ROM, digital video disc (DVD), a Blu-Ray® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, dynamic random access memory (DRAM)-based SSDs, magnetoresistive RAM (MRAM) SSDs, and hybrid SSDs that use a combination of DRAM and flash memory based SSDs.

In certain aspects, storage subsystem 718 may also include a computer-readable storage media reader 720 that can further be connected to computer-readable storage media 722. Reader 720 may receive and be configured to read data from a memory device such as a disk, a flash drive, etc.

In certain aspects, computer system 700 may support virtualization technologies, including but not limited to virtualization of processing and memory resources. For example, computer system 700 may provide support for executing one or more virtual machines. In certain aspects, computer system 700 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 700. Accordingly, multiple operating systems may potentially be run concurrently by computer system 700.

Communications subsystem 724 provides an interface to other computer systems and networks. Communications subsystem 724 serves as an interface for receiving data from and transmitting data to other systems from computer system 700. For example, communications subsystem 724 may enable computer system 700 to establish a communication channel to one or more client devices via the Internet for receiving and sending information from and to the client devices. For example, the communication subsystem may be used to transmit a response to a user regarding the inquiry for a Chabot.

Communication subsystem 724 may support both wired and/or wireless communication protocols. For example, in certain aspects, communications subsystem 724 may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.XX family standards, or other mobile communication technologies, or any combination thereof), global positioning system (GPS) receiver components, and/or other components. In some aspects communications subsystem 724 can provide wired network connectivity (e.g., Ethernet) in addition to or instead of a wireless interface.

Communication subsystem 724 can receive and transmit data in various forms. For example, in some aspects, in addition to other forms, communications subsystem 724 may receive input communications in the form of structured and/or unstructured data feeds 726, event streams 728, event updates 730, and the like. For example, communications subsystem 724 may be configured to receive (or send) data feeds 726 in real-time from users of social media networks and/or other communication services such as Twitter® feeds, Facebook® updates, web feeds such as Rich Site Summary (RSS) feeds, and/or real-time updates from one or more third party information sources.

In certain aspects, communications subsystem 724 may be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 724 may also be configured to communicate data from computer system 700 to other computer systems or networks. The data may be communicated in various different forms such as structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a personal digital assistant (PDA)), a wearable device (e.g., a Google Glass® head mounted display), a personal computer, a workstation, a mainframe, a kiosk, a server rack, or any other data processing system. Due to the ever-changing nature of computers and networks, the description of computer system 700 depicted in FIG. 7 is intended only as a specific example. Many other configurations having more or fewer components than the system depicted in FIG. 7 are possible. Based on the disclosure and teachings provided herein, a person of ordinary skill in the art can appreciate other ways and/or methods to implement the various aspects.

Although specific aspects have been described, various modifications, alterations, alternative constructions, and equivalents are possible. Embodiments are not restricted to operation within certain specific data processing environments, but are free to operate within a plurality of data processing environments. Additionally, although certain aspects have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described aspects may be used individually or jointly.

Further, while certain aspects have been described using a particular combination of hardware and software, it should be recognized that other combinations of hardware and software are also possible. Certain aspects may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the aspects. However, aspects may be practiced without these specific details. For example, well-known circuits, processes, algorithms, structures, and techniques have been shown without unnecessary detail in order to avoid obscuring the aspects. This description provides example aspects only, and is not intended to limit the scope, applicability, or configuration of other aspects. Rather, the preceding description of the aspects can provide those skilled in the art with an enabling description for implementing various aspects. Various changes may be made in the function and arrangement of elements.

The specification and drawings are, accordingly, to be regarded in an illustrative rather than a restrictive sense. It can, however, be evident that additions, subtractions, deletions, and other modifications and changes may be made thereunto without departing from the broader spirit and scope as set forth in the claims. Thus, although specific aspects have been described, these are not intended to be limiting. Various modifications and equivalents are within the scope of the following claims.

What is claimed is:

1. A computer-implemented method comprising:
   receiving a first request for secondary content to be included in a first active user session with a content distribution service, wherein the first request identifies an address of the content distribution service, and wherein the content distribution service provides primary content for user consumption in the first active user session;
   in response to the first request and based at least in part on the address, determining whether the content distribution service is included in a set of labeled content distribution services;
   based at least in part on determining that the content distribution service is not included in the set of labeled content distribution services:
      retrieving the primary content from the address in an automated second active session with the content distribution service;
      generating one or more vector embeddings of the primary content for comparison with a plurality of vector embeddings from a plurality of contextual personalities to select one or more contextual personality labels, wherein each of the plurality of vector embeddings is determined from a plurality of content items that have been associated with corresponding contextual personalities;
   adding the content distribution service, in association with the one or more contextual personality labels, to the set of labeled content distribution services;
   receiving a second request for secondary content to be included in a third active user session with the content distribution service;
   in response to the second request, determining that the content distribution service is included in the set of labeled content distribution services in association with one or more contextual personality labels, wherein accessing the set of labeled content distribution services to determine the one or more contextual personality labels does not require personal information about a second active user of the third active user session;
   causing one or more secondary content items associated with the one or more contextual personality labels to be included in the third active user session with the content distribution service.

2. The computer-implemented method of claim 1, wherein the one or more vector embeddings of the primary content are based at least in part on:
   a first determination of whether the primary content has keywords of a first set of keywords associated with a first contextual personality label, and
   a second determination of whether the primary content has keywords of a second set of keywords associated with a second contextual personality label;
   wherein the one or more contextual personality labels include at least the first contextual personality label and exclude at least the second contextual personality label based at least in part on the keywords in the primary content.

3. The computer-implemented method of claim 1, further comprising:
   automatically generating a textual description of image data in the primary content;
   wherein the one or more vector embeddings of the primary content are based at least in part on:
   a first determination of whether the textual description has keywords of a first set of keywords associated with a first contextual personality label, and
   a second determination of whether the textual description has keywords of a second set of keywords associated with a second contextual personality label;
   wherein the one or more contextual personality labels for the primary content include at least the first contextual personality label and exclude at least the second contextual personality label based at least in part on the keywords in the textual description.

4. The computer-implemented method of claim 1, wherein the second request for secondary content identifies the second active user of the third active user session, the method further comprising:
   updating a profile of the second active user by adding a stored association with the one or more contextual personality labels;
   wherein the profile causes the second active user to be included in a content delivery campaign; wherein user input parameters to the content delivery campaign identify the one or more contextual personality labels without identifying the second active user; and wherein the content delivery campaign causes delivery of particular content to the second active user using contact details of the second active user from the profile of the second active user.

5. The computer-implemented method of claim 1, further comprising:
  storing a plurality of profiles for a plurality of users associated with a particular contextual personality label;
  determining that a subset of users of the plurality of users visited a particular content distribution service that is included in the set of labeled content distribution services but is not labeled with the particular contextual personality label;
  based on determining that the subset of users visited the particular content distribution service, adding the particular contextual personality label to the particular content distribution service in the set of labeled content distribution services.

6. The computer-implemented method of claim 1, further comprising:
  storing a plurality of profiles for a plurality of users associated with a particular contextual personality label;
  determining that a subset of users of the plurality of users has not visited a particular content distribution service that is included in the set of labeled content distribution services and is labeled with the particular contextual personality label;
  based on determining that the subset of users has not visited the particular content distribution service, removing the particular contextual personality label from the particular content distribution service in the set of labeled content distribution services.

7. The computer-implemented method of claim 1, further comprising determining which content to promote to a particular user based at least in part on a score, in a particular profile of the particular user, of one or more contextual personality labels;
  causing delivery, to the particular user, of particular content marked with the one or more contextual personality labels, wherein the particular content includes an embedded tracking identifier;
  using the embedded tracking identifier to track engagement by the particular user, with the particular content;
  updating the particular profile of the particular user to increase the score of the one or more contextual personality labels based at least in part on the tracked engagement.

8. A computer-implemented method of claim 1, further comprising:
  determining which content to promote to a particular user based at least in part on an association between the particular user and one or more contextual personality labels;
  causing delivery, to the particular user, of particular content based on content metadata comprising a score of the particular content for the one or more contextual personality labels, wherein the particular content includes an embedded tracking identifier;
  using the embedded tracking identifier to track engagement by the particular user, with the particular content;
  updating the score of the particular content for the one or more contextual personality labels to increase the score based at least in part on the tracked engagement.

9. A computer-implemented method of claim 1, further comprising:
  based at least in part on the set of labeled content distribution services, determining a set of keywords associated with the one or more contextual personality labels;
  providing a plurality of keywords of the set of keywords as a prompt to a large language model to automatically generate graphical content to be included in a corpus of content for delivery in association with the one or more contextual personality labels;
  selecting the automatically generated graphical content as at least part of the one or more secondary content items.

10. A computer-implemented method of claim 4, further comprising:
  based at least in part on the set of labeled content distribution services, determining a set of keywords associated with the one or more contextual personality labels;
  providing a plurality of keywords of the set of keywords as a prompt to a large language model to automatically generate a text template to be included in a corpus of content for delivery in association with the one or more contextual personality labels;
  selecting the automatically generated text template as at least part of the particular content for which delivery is caused to the second active user.

11. A computer-program product comprising one or more non-transitory machine-readable storage media, including stored instructions configured to cause a computing system to perform a set of actions including:
  receiving a first request for secondary content to be included in a first active user session with a content distribution service, wherein the first request identifies an address of the content distribution service, and wherein the content distribution service provides primary content for user consumption in the first active user session;
  in response to the first request and based at least in part on the address, determining whether the content distribution service is included in a set of labeled content distribution services;
  based at least in part on determining that the content distribution service is not included in the set of labeled content distribution services:
    retrieving the primary content from the address in an automated second active session with the content distribution service;
    generating one or more vector embeddings of the primary content for comparison with a plurality of vector embeddings from a plurality of contextual personalities to select one or more contextual personality labels, wherein each of the plurality of vector embeddings is determined from a plurality of content items that have been associated with corresponding contextual personalities;
    adding the content distribution service, in association with the one or more contextual personality labels, to the set of labeled content distribution services;
  receiving a second request for secondary content to be included in a third active user session with the content distribution service;
  in response to the second request, determining that the content distribution service is included in the set of labeled content distribution services in association with one or more contextual personality labels, wherein accessing the set of labeled content distribution services to determine the one or more contextual personality labels does not require personal information about a second active user of the third active user session;

causing one or more secondary content items associated with the one or more contextual personality labels to be included in the third active user session with the content distribution service.

12. The computer-program product of claim 11, wherein the one or more vector embeddings of the primary content are based at least in part on:
   a first determination of whether the primary content has keywords of a first set of keywords associated with a first contextual personality label, and
   a second determination of whether the primary content has keywords of a second set of keywords associated with a second contextual personality label;
   wherein the one or more contextual personality labels include at least the first contextual personality label and exclude at least the second contextual personality label based at least in part on the keywords in the primary content.

13. The computer-program product of claim 11, wherein the second request for secondary content identifies the second active user of the third active user session, and wherein the set of actions further includes:
   updating a profile of the second active user by adding a stored association with the one or more contextual personality labels;
   wherein the profile causes the second active user to be included in a content delivery campaign; wherein user input parameters to the content delivery campaign identify the one or more contextual personality labels without identifying the second active user; and wherein the content delivery campaign causes delivery of particular content to the second active user using contact details of the second active user from the profile of the second active user.

14. The computer-program product of claim 11, wherein the set of actions further includes:
   storing a plurality of profiles for a plurality of users associated with a particular contextual personality label;
   determining that a subset of users of the plurality of users visited a particular content distribution service that is included in the set of labeled content distribution services but is not labeled with the particular contextual personality label;
   based on determining that the subset of users visited the particular content distribution service, adding the particular contextual personality label to the particular content distribution service in the set of labeled content distribution services.

15. The computer-program product of claim 11, wherein the set of actions further includes:
   based at least in part on the set of labeled content distribution services, determining a set of keywords associated with the one or more contextual personality labels;
   providing a plurality of keywords of the set of keywords as a prompt to a large language model to automatically generate graphical content to be included in a corpus of content for delivery in association with the one or more contextual personality labels;
   selecting the automatically generated graphical content as at least part of the one or more secondary content items.

16. A system comprising:
   one or more processors;
   one or more non-transitory computer-readable media storing instructions, which, when executed by the system, cause the system to perform a set of actions including:
   receiving a first request for secondary content to be included in a first active user session with a content distribution service, wherein the first request identifies an address of the content distribution service, and wherein the content distribution service provides primary content for user consumption in the first active user session;
   in response to the first request and based at least in part on the address, determining whether the content distribution service is included in a set of labeled content distribution services;
   based at least in part on determining that the content distribution service is not included in the set of labeled content distribution services:
      retrieving the primary content from the address in an automated second active session with the content distribution service;
      generating one or more vector embeddings of the primary content for comparison with a plurality of vector embeddings from a plurality of contextual personalities to select one or more contextual personality labels, wherein each of the plurality of vector embeddings is determined from a plurality of content items that have been associated with corresponding contextual personalities;
      adding the content distribution service, in association with the one or more contextual personality labels, to the set of labeled content distribution services;
   receiving a second request for secondary content to be included in a third active user session with the content distribution service;
   in response to the second request, determining that the content distribution service is included in the set of labeled content distribution services in association with one or more contextual personality labels, wherein accessing the set of labeled content distribution services to determine the one or more contextual personality labels does not require personal information about a second active user of the third active user session;
   causing one or more secondary content items associated with the one or more contextual personality labels to be included in the third active user session with the content distribution service.

17. The system of claim 16, wherein the one or more vector embeddings of the primary content are based at least in part on:
   a first determination of whether the primary content has keywords of a first set of keywords associated with a first contextual personality label, and
   a second determination of whether the primary content has keywords of a second set of keywords associated with a second contextual personality label;
   wherein the one or more contextual personality labels include at least the first contextual personality label and exclude at least the second contextual personality label based at least in part on the keywords in the primary content.

18. The system of claim 16, wherein the second request for secondary content identifies the second active user of the third active user session, and wherein the set of actions further includes:
   updating a profile of the second active user by adding a stored association with the one or more contextual personality labels;

wherein the profile causes the second active user to be included in a content delivery campaign; wherein user input parameters to the content delivery campaign identify the one or more contextual personality labels without identifying the second active user; and wherein the content delivery campaign causes delivery of particular content to the second active user using contact details of the second active user from the profile of the second active user.

19. The system of claim 16, wherein the set of actions further includes:
   storing a plurality of profiles for a plurality of users associated with a particular contextual personality label;
   determining that a subset of users of the plurality of users visited a particular content distribution service that is included in the set of labeled content distribution services but is not labeled with the particular contextual personality label;
   based on determining that the subset of users visited the particular content distribution service, adding the particular contextual personality label to the particular content distribution service in the set of labeled content distribution services.

20. The system of claim 16, wherein the set of actions further includes:
   based at least in part on the set of labeled content distribution services, determining a set of keywords associated with the one or more contextual personality labels;
   providing a plurality of keywords of the set of keywords as a prompt to a large language model to automatically generate graphical content to be included in a corpus of content for delivery in association with the one or more contextual personality labels;
   selecting the automatically generated graphical content as at least part of the one or more secondary content items.

* * * * *